(12) United States Patent
Meurer

(10) Patent No.: US 7,718,076 B1
(45) Date of Patent: May 18, 2010

(54) METHODS OF AND COMMON GANTRY DRIVE FOR SINGLE-PASS CLEANING OF MULTIPLE STAGES OF A MATERIAL SEPARATION AND REMOVAL SYSTEM

(76) Inventor: Charles Lonnie Meurer, 2389 Bitterroot La., Golden, CO (US) 80401

( * ) Notice: Subject to any disclaimer, the term of this patent is extended or adjusted under 35 U.S.C. 154(b) by 1130 days.

(21) Appl. No.: 11/354,352

(22) Filed: Feb. 14, 2006

(51) Int. Cl.
*B01D 21/04* (2006.01)

(52) U.S. Cl. .................... 210/802; 210/803; 428/177; 428/192

(58) Field of Classification Search ............ 210/802, 210/803, 521, 527; 428/177, 192; 209/606
See application file for complete search history.

(56) References Cited

U.S. PATENT DOCUMENTS

| | | | |
|---|---|---|---|
| 630,962 A | 8/1899 | Wood | |
| 747,113 A | 12/1903 | Allen | |
| 748,981 A | 1/1904 | Oliver | 210/540 |
| 1,102,463 A | 7/1914 | Wyckoff | 210/519 |
| 1,493,861 A | 5/1924 | Raymond | 210/519 |
| 1,543,621 A | 6/1925 | Ruckstuhl | |
| 1,557,340 A | 10/1925 | Sandmann | 210/522 |
| 1,703,967 A | 3/1929 | Sperr, Jr. | 261/122.1 |
| 1,717,713 A | 6/1929 | Logan | 261/122.1 |
| 1,793,510 A | 2/1931 | Raymond | 210/519 |
| 1,918,742 A | 7/1933 | Elrod | 210/525 |
| 2,144,385 A | 1/1939 | Nordell | 210/3 |
| 2,242,139 A | 5/1941 | Monroe | 210/540 |
| 2,302,450 A | 11/1942 | Laughlin | 210/130 |
| 2,314,977 A | 3/1943 | Green | 210/522 |
| 2,328,655 A | 9/1943 | Lannert | 261/122 |
| 2,379,615 A | 7/1945 | Walker | 210/176 |
| 2,502,187 A | 3/1950 | Wahlgren | 261/122 |
| 2,589,882 A | 3/1952 | Sinner et al. | 242/388 |
| 2,640,682 A | 6/1953 | Votypka | 242/388 |
| 2,650,810 A | 9/1953 | Nordell | 261/121 |

(Continued)

FOREIGN PATENT DOCUMENTS

GB 742315 12/1955

(Continued)

OTHER PUBLICATIONS

Hazen, A.; On Sedimentation, 1904, Transactions of the American Society of Civil Engineers, vol. 53, pp. 45-88.

*Primary Examiner*—Walter D Griffin
*Assistant Examiner*—Cameron J Allen
(74) *Attorney, Agent, or Firm*—Sheridan Ross P.C.

(57) ABSTRACT

Efficient methods and apparatus for separating both settleable-particles and finer-non-settlable-particles from particle-laden fluid are provided by combining many successive settling, filtration, and treatment stages in one basin. A sludge and finer-particle removal system combined into the one basin is configured with a common gantry drive having many arms hanging from an overhead beam, each arm carrying a particle remover configured for the corresponding stage. In one stage, a practical method of removing sludge from between closely-spaced settler flow trays is provided by one pair of arms that straddle the trays and move an array of pushers during movement of the common gantry drive. During that movement the common gantry drive also removes the finer-non-settleable-particles from all downstream stages of filtration and treatment, and each stage continues operating while the common gantry drive operates to perform the respective removal.

23 Claims, 16 Drawing Sheets

U.S. PATENT DOCUMENTS

| | | | |
|---|---|---|---|
| 2,684,330 A | 7/1954 | Frenth | 210/8 |
| 2,897,976 A | 8/1959 | Arthur | 210/173 |
| 2,930,485 A | 3/1960 | Nordell | 210/158 |
| 2,947,525 A | 8/1960 | Klein | 261/122 |
| 2,977,284 A | 8/1961 | Nechine | 261/DIG. 47 |
| 3,063,689 A | 11/1962 | Coppock | 261/124 |
| 3,083,953 A | 4/1963 | Langdon et al. | 261/122 |
| 3,134,324 A | 5/1964 | Schwaninger | 101/269 |
| 3,321,185 A | 5/1967 | Zenke | 242/388 |
| 3,333,704 A | 8/1967 | McGivern | 210/242 |
| 3,353,683 A | 11/1967 | Geiger | 210/527 |
| 3,416,176 A | 12/1968 | Ravitts | 15/1.7 |
| 3,494,462 A | 2/1970 | Baud | 210/112 |
| 3,613,564 A | 10/1971 | Adamski | 100/118 |
| 3,613,889 A | 10/1971 | Reed | 210/84 |
| 3,616,651 A | 11/1971 | Chang et al. | 405/158 |
| 3,669,271 A | 6/1972 | McGivern | 210/128 |
| 3,706,384 A | 12/1972 | Weijman-Hane | 210/519 |
| 3,707,737 A | 1/1973 | Brower | 15/1.7 |
| 3,802,676 A | 4/1974 | Thayer | 261/122 |
| 3,846,291 A | 11/1974 | Brucker | 210/14 |
| 3,864,441 A | 2/1975 | Sizuki | 261/DIG. 47 |
| 3,872,960 A | 3/1975 | Gabor | 197/53 |
| 3,880,965 A | 4/1975 | Dudis et al. | 261/122 |
| 3,903,000 A | 9/1975 | Miura et al. | 210/251 |
| 3,925,205 A | 12/1975 | Sparham | 210/73 |
| 3,963,624 A | 6/1976 | Henderson et al. | 210/521 |
| 3,980,561 A | 9/1976 | Miyagi et al. | 210/151 |
| 3,985,207 A | 10/1976 | Petit | 187/213 |
| 4,002,105 A | 1/1977 | Bell | 92/65 |
| 4,048,267 A | 9/1977 | Walker et al. | 261/122.1 |
| 4,071,443 A | 1/1978 | Gorski et al. | 210/7 |
| 4,090,966 A | 5/1978 | Clendenen | 210/143 |
| 4,136,012 A | 1/1979 | Louboutin et al. | 210/208 |
| 4,148,731 A | 4/1979 | Brigante | 210/223 |
| 4,193,871 A | 3/1980 | White et al. | 210/525 |
| 4,194,976 A | 3/1980 | Robinsky | 210/137 |
| 4,198,871 A | 4/1980 | Dunn et al. | 74/37 |
| 4,221,671 A | 9/1980 | Meurer | 210/522 |
| 4,245,396 A | 1/1981 | Maffet | 34/391 X |
| 4,246,102 A | 1/1981 | Hjelmner et al. | 210/704 |
| 4,294,696 A | 10/1981 | Thayer | 261/122.1 |
| 4,346,005 A | 8/1982 | Zimmerman | 210/232 |
| 4,401,335 A | 8/1983 | Godbersen | 187/213 |
| 4,401,576 A | 8/1983 | Meurer | 210/803 |
| 4,431,597 A | 2/1984 | Cramer et al. | 261/DIG. 47 |
| 4,477,939 A | 10/1984 | White et al. | 15/246.5 |
| 4,514,303 A | 4/1985 | Moore | 210/519 |
| 4,551,246 A | 11/1985 | Coffing | 210/221 |
| 4,555,340 A | 11/1985 | Boyle | 210/248 |
| 4,859,327 A | 8/1989 | Cox et al. | 210/219 |
| 4,865,753 A | 9/1989 | Meurer | 210/802 |
| 4,886,605 A | 12/1989 | Herve | 210/519 |
| 4,889,624 A | 12/1989 | Soriente et al. | 210/232 |
| 4,926,973 A | 5/1990 | Smith | 187/213 |
| 4,933,524 A | 6/1990 | Meurer | |
| 4,957,014 A | 9/1990 | Burke | 74/89.22 |
| 4,957,628 A | 9/1990 | Schulz | 210/519 |
| 4,960,546 A | 10/1990 | Tharp | 261/122 |
| 4,986,141 A | 1/1991 | Meurer | 74/89.22 |
| 4,988,441 A | 1/1991 | Moir | 210/522 |
| 5,013,435 A | 5/1991 | Rider et al. | 210/262 |
| 5,013,493 A | 5/1991 | Tharp | 261/122 |
| 5,018,925 A | 5/1991 | Ganser | 187/213 |
| 5,021,153 A | 6/1991 | Haws | 210/221.24 |
| 5,059,312 A | 10/1991 | Galletti | 210/540 |
| 5,087,391 A | 2/1992 | Brown | 261/122.1 |
| 5,101,849 A | 4/1992 | Richard | 137/15 |
| 5,116,443 A | 5/1992 | Meurer | 156/209 |
| 5,120,436 A | 6/1992 | Reichner | 210/207 |
| 5,125,931 A | 6/1992 | Schulz | 44/552 |
| 5,132,010 A | 7/1992 | Ossenhop | 210/522 |
| 5,143,625 A | 9/1992 | Ballard | 210/802 |
| 5,160,460 A | 11/1992 | Goetz et al. | 261/122.1 |
| 5,204,000 A | 4/1993 | Steadman et al. | 210/519 |
| 5,217,614 A | 6/1993 | Meurer | 210/521 |
| 5,290,487 A | 3/1994 | Ludwig | 261/122.1 |
| 5,300,232 A | 4/1994 | Barrington et al. | 210/742 |
| 5,366,638 A | 11/1994 | Moore | 210/802 |
| 5,378,378 A | 1/1995 | Meurer | 210/788 |
| 5,388,480 A | 2/1995 | Townsend | 242/388.5 |
| 5,391,306 A | 2/1995 | Meurer | 210/802 |
| 5,427,471 A | 6/1995 | Godbersen | 187/213 |
| 5,435,924 A | 7/1995 | Albertson | 210/803 |
| 5,497,854 A | 3/1996 | Fang | 187/213 |
| 5,510,025 A | 4/1996 | Benesi | 210/227 |
| 5,552,050 A | 9/1996 | Valentin | 210/525 |
| 5,655,727 A | 8/1997 | Meurer | 242/388 |
| 5,692,435 A | 12/1997 | Nissen | 100/126 |
| 5,693,323 A | 12/1997 | Yamamoto | 210/540 |
| 5,804,104 A | 9/1998 | Brauch et al. | 210/220 |
| 5,830,356 A | 11/1998 | Kaupilla | 210/528 |
| 5,945,040 A | 8/1999 | Brauch et al. | 261/122.1 |
| 6,045,709 A | 4/2000 | Roberts | 210/803 |
| 6,086,058 A | 7/2000 | Brauch et al. | |
| 6,129,215 A | 10/2000 | Brauch et al. | |
| 6,158,142 A | 12/2000 | Brauch et al. | 34/144 |
| 6,234,323 B1 | 5/2001 | Sarroug | 210/523 |
| 6,245,243 B1 | 6/2001 | Meurer | 210/802 |
| 6,426,009 B1 | 7/2002 | Meurer et al. | |
| 6,497,249 B1 | 12/2002 | Swan et al. | 210/527 |
| 6,951,620 B2 | 10/2005 | Brauch et al. | 210/803 |
| 6,971,398 B1 | 12/2005 | Brauch et al. | |
| 7,021,471 B2 | 4/2006 | Meurer | 210/523 |
| 7,021,472 B1 | 4/2006 | Meurer | |
| 7,159,724 B2 | 1/2007 | Brauch et al. | |
| 7,314,572 B1 * | 1/2008 | Meurer | 210/802 |

FOREIGN PATENT DOCUMENTS

GB    1329599    9/1973

* cited by examiner

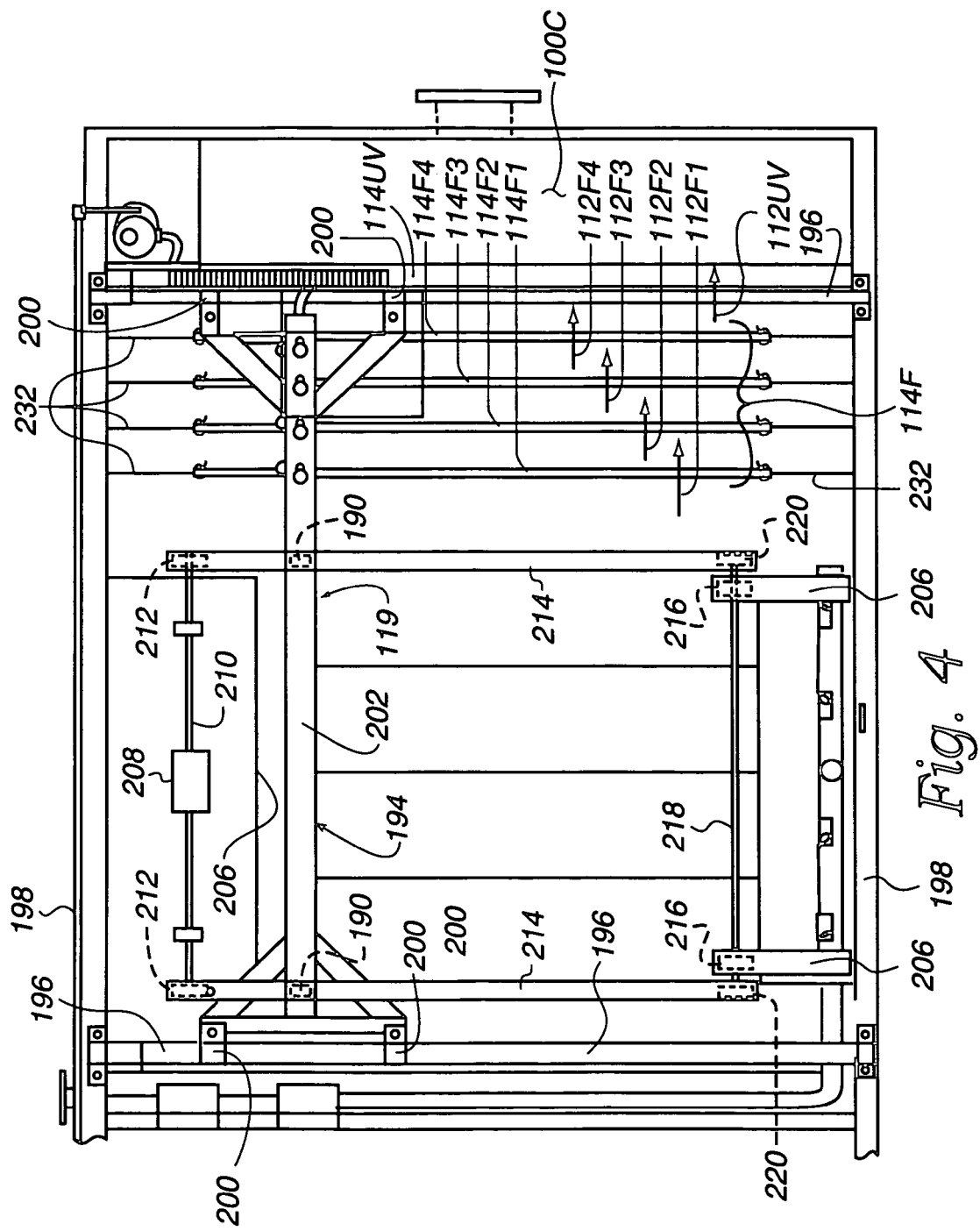

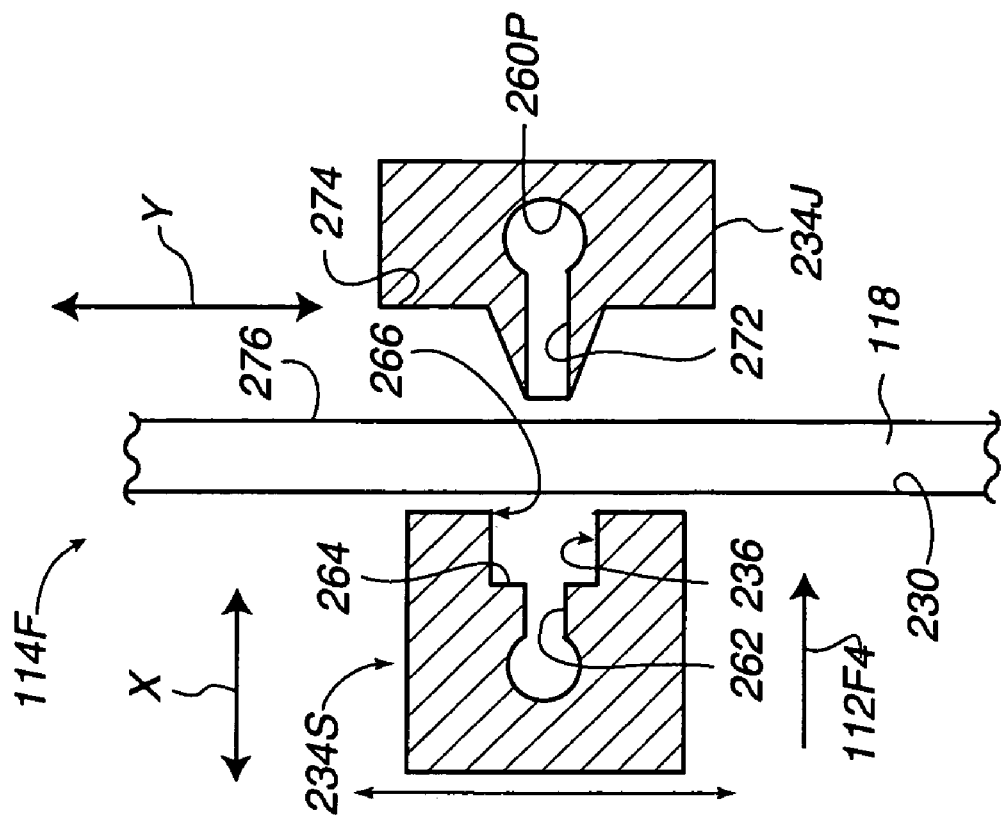
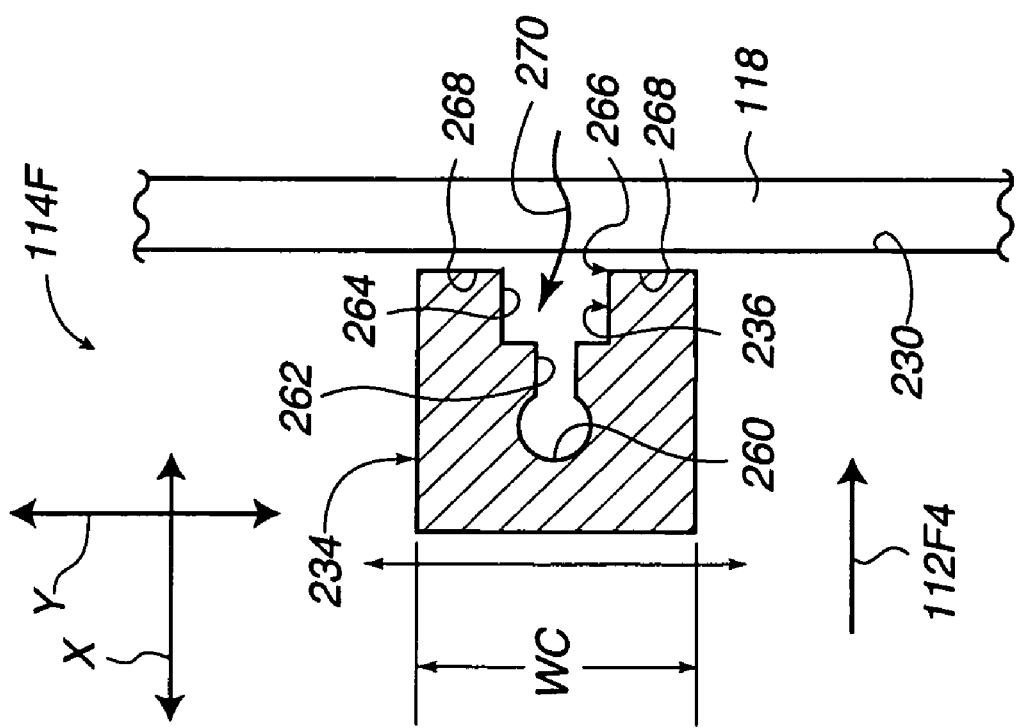
Fig. 5B
Fig. 5A

METHODS OF AND COMMON GANTRY DRIVE FOR SINGLE-PASS CLEANING OF MULTIPLE STAGES OF A MATERIAL SEPARATION AND REMOVAL SYSTEM

RELATED APPLICATION

This application is related to a co-pending patent application Ser. No. 11/354,396 filed in the name of C. Lonnie Meurer on Feb. 14, 2006, and entitled METHODS OF AND APPARATUS FOR LOW-ANGLE-TRAY SETTLING WITH MULTI-ZONE CONFIGURATION, the "co-pending application", the disclosure of which is incorporated herein by reference.

FIELD

The present invention relates to the separation and removal of materials from fluids, and more particularly, to a gantry drive that is common to multiple stages of a material separation system, so that in a single pass of the common gantry drive, separated material is removed from each of the stages of the material separation system while ongoing material separation operations continue in each stage.

BACKGROUND

In the processing of fluids, such as water and waste water, it is necessary to separate materials from the fluid to render the fluid suitable for use or reuse. For example, as water purity standards increase, many stages of material separation may be required in order to output adequately clean water when the input water is dirty, such as in municipal waste water systems. In such municipal systems, after biological processes, further processes may include one or more flocculation stages designed to agglomerate very fine particles resulting from the biological processes. The very fine particles are less dense than the fluid, and may be referred to as finer, non-settleable-particles, as described below. The flocculation stages transform the very fine particles into particles that are denser than the fluid. However, significant amounts of such very fine particles may also be unchanged, or minimally changed, by the flocculation stage, and may not be denser than the fluid.

As a result of the density differences between the less dense fluid and the denser particles, in a settling process stage after a final flocculation stage, the denser particles move downwardly under the force of gravity as the fluid and the particles flow. In the settling stage, the denser particles are said to "settle" and form sludge (e.g., at the bottom of a basin), whereas the finer, non-settleable-particles do not settle. The fluid input to the settling stage may be referred to as "particle-laden fluid", and may include the denser, settleable-particles and the finer, non-settleable-particles. The settled-particles at the bottom of a basin may be referred to as "sludge". Sludge is characterized by a greater density of the settled-particles in a given volume than when the settleable-particles are flowing in the fluid. This settling may be referred to as "separation" of the settleable-particles from the fluid, whereas one aspect of "removal" (or "removing") refers to taking the settleable, separated particles (sludge) from the material separation system. References herein to "fluid" are references to such "particle-laden fluid", it being understood that "clean fluid" is the "particle-laden fluid" from which most of the settleable-particles have been removed (as by settling), and that "cleaner fluid" is the "particle-laden fluid" from which substantially all of the particles have been removed (as by settling, then filtering to an exemplary five micron level), and that "cleanest" fluid is the cleaner fluid after treatment such as ultraviolet radiation treatment.

As noted, because the significant amounts of the finer, non-settleable-particles may also be unchanged, or minimally changed, by the flocculation stage(s), the finer, non-settleable-particles are present in the fluid input to the settling process. Although the fluid output from the settling stage is substantially-free of the settleable-particles, that output fluid includes enough finer, non-settleable-particles that successive stages (e.g., filtration) are required for "separation" of the finer, non-settleable-particles from the fluid. Thus, following the settling stage, many filters must be provided to separate successively finer and finer, non-settleable-particles from the fluid. Lastly, additional treatment may be provided to the filtered fluid, as by ultraviolet treatment. Thereafter, in a clean water-collection stage, the cleanest fluid exits from the material separation system. As used herein, "removal" (or "removing") also refers to taking the non-settleable separated particles from the filtering and/or treatment stage, if not also from the material separation system.

In the past, each of the particle separation and treatment stages has been provided with separate equipment for removing the respective particles from the particular stage, and each separate stage and removal equipment has been provided in a separate basin. In the settling stage many types of systems have been used, for example, to traverse the bottom of a settler basin and collect (e.g., via suction) the sludge. These systems operate only in the settler basin in which the settling process is being performed. Some types of suction sludge collection equipment have been configured especially for inclined-plate settlers in which the settled-particles are settling from between the plates onto the bottom of the settler basin, where the sludge gathers. Although improvements have been made to these systems, one design criteria has remained, namely, that the sludge removal equipment operates under the settler in the settler basin, separately from later basins that house later stages of the material separation and treatment system.

In the past, filtration stages have been provided downstream and separately from the settler basin. For example, in filtration basins separate from the settler basin, it has been typical to provide granular material on the floor of the filtration basins, and to configure the floor to be porous. The fluid and the finer, non-settleable-particles enter the filtration basin. The porous floors allow the fluid in the filtration basin to flow through the granular material, where the finer, non-settleable-particles are separated from the fluid. The resulting cleaner fluid exits the separate filtration basin without the finer, non-settleable-particles. However, these separate filtration stages have to be shut down to allow backwashing (i.e., removal) of the granular material. As an example of how removal has been provided, part of a filtration system has been by-passed during backwashing of that part, and a non-by-passed part has continued the filtration operations, but at a reduced rate of filtration. Alternatively, duplicate normal-rate filtration systems have been provided in parallel with each other, to allow one filtration system to perform filtering operations at the normal rate, while the backwashing is performed in the other shut-down filtration system. Thus each exemplary backwashing approach has a disadvantage that needs to be eliminated if more efficient separation and removal is to be provided.

A less-used way of continuously cleaning a filter for fluids in a flow stream uses different filter media. This filter media has been configured as a disk with a circular perimeter and some thickness. The disk has been mounted vertically on an horizontal axis and rotated. The fluid and the finer, nonsettleable-particles flow perpendicularly to the rotating disk, and the fluid flows through the rotating filter media. The finer, non-settleable-particles are separated by the disk of filter media. A stationary suction unit has been placed next to the rotating disk on the side of the incoming fluid. The stationary suction unit removes filtered particles from the disk as the disk rotates past the stationary suction unit. Thus, the stationary suction unit does not have to move due to the rotation of the disk, and the filter unit is in a separate filter basin.

Another aspect of removal of particles from separation systems relates to improvements in settlers. One such improvement is the subject of the above-identified co-pending application. In the co-pending application, changes have been made in the configuration and orientation of settler plates, which are referred to as trays. The trays are mounted at a low-angle with respect to horizontal and are configured to define many narrow flow channels. A new configuration is that the settleable-particles settle from each flow channel, and rapidly settle into and are retained in a pocket defined by the tray configuration. Sludge forms in the pocket. The trays are provided in a vertically-spaced array, one tray above a next tray. From about fifty to about 250 vertically-spaced trays may be provided in one settler unit, for example. Another improvement of such low-angle tray settler is an ability to remove the sludge from each of the many pockets, and to do so without interfering with the settling operations that are ongoing between pairs of the trays.

These improvements contrast with problems that have arisen in attempts to make practical use of the theoretical design of a proposed clarifier apparatus in the form of a settler having at least two closely-spaced (e.g., one inch) flat thin-edge pates. The flat thin-edge plates have thin edges that allow a flow of particle-laden fluid into a narrow (e.g., 1 inch high) flow channel between the two closely-spaced flat thin-edge plates. As proposed, the flat thin-edge plates were horizontal, but as described below this proposed horizontal approach has to Applicant's knowledge never been successfully implemented even though the narrow flow channel enables a settling depth to be very short (e.g., slightly less than the narrow one inch height of the flow channel). As proposed, settleable-particles would settle through such settling depth onto a lower plate of the two flat thin-edge plates. Upon settling onto the lower flat thin-edge plate, the settleable-particles would form the sludge. Because the proposed flat thin-edge plate would be horizontal, there was a theoretical but unrealized benefit of somewhat shortening the length of the fluid-flow distance (e.g., horizontal) required to separate the settleable-particles from the particle-laden fluid to form the sludge on the lower flat thin-edge plate.

The problems that have arisen in attempts to make practical use of the theoretical design of these proposed closely-spaced horizontal flat thin-edge plates include the following. Even though the flow channel between two of these proposed flat thin-edge plates is very narrow (i.e., the one inch), it was intended that the settleable-particles would settle onto the flat thin-edge lower plate, and would form the denser sludge on the flat thin-edge horizontal lower plate. Thus, the result of the proposed two closely-spaced flat horizontal thin-edge plates was to confine the ongoing flow of the fluid through the narrow flow channel in the same space (or volume) that is occupied by the sludge. One problem identified by Applicant is that this proposed ongoing fluid flow would thus have a flow rate that would increase as the thickness of the settled sludge increases. The increase in the flow rate would be in a direction of the flow (e.g., an X direction), which is undesirable because it requires more flow length (X direction) to settle the settleable-particles from a fluid flowing at a high flow rate as compared to fluid flowing at a lower flow rate. This requirement is due to the higher flow rate fluid carrying the sludge in the narrow flow channel above the lower flat thin-edge plate, where such carrying would be in the X direction of the fluid flow. Applicant has observed that the higher flow rate would not allow the settling to occur rapidly in the downward (or Z) direction of the force of gravity (FG). Another problem observed by Applicant is that this carrying of the sludge in the X direction would offset (reduce) the goal of shortening the settling length (in the X direction), making it necessary to increase the length and thus the area of these types of proposed settlers. Additionally, it appears to Applicant that attempts to remove the sludge from between the closely-spaced flat horizontal thin-edge plates would interfere with the settling of the settleable-particles by mixing the previously-settled-particles with the cleaner fluid, which again would require more flow length in the X direction to do the same amount of settling and which reduces the practicality of this type of sludge removal impractical.

What is needed then is a way to more efficiently separate particles from particle-laden fluid. The more efficient separation should apply both to settleable-particles, and to the finer, non-settleable-particles. The more efficient separation should reduce inefficiencies of the many prior separate settling and filtration stages, and further provide more efficient sludge removal and finer, non-settleable-particle removal functions. An improved system should perform those more efficient removal functions using more efficient apparatus. Also, the needed way should provide practical methods and apparatus for removing the sludge from between closely-spaced trays of an improved settler, such as the settler of the co-pending application. There is a need for removal of sludge from a settler without having cross-flow of sludge and incoming dirty flow. Finally, there is also a need to allow each stage of filtration to continue full operations as the particle removal operation is performed, but to avoid the by-pass and duplication of equipment that characterizes prior filter systems.

SUMMARY

Embodiments of the present invention meet the above needs by providing more efficient ways of separating both settleable-particles and finer, non-settleable-particles from particle-laden fluid. The more efficient separation also allows combination into one basin of many successive settling and filtration stages, including ultraviolet treatment. The more efficient separation further provides a sludge and finer, non-settleable-particle removal system combined into the one basin that is configured with a common gantry drive. The common gantry drive provides practical methods for removing the sludge from between closely-spaced trays of the improved settler, such as the settler of the co-pending application. This removing of the sludge occurs during movement of the common gantry drive, and the common gantry drive simultaneously removes finer, non-settleable-particles from all of stages of filtration and treatment. These embodiments also allow each stage of settling, filtration and treatment to continue full operations as the common gantry drive operates to remove the sludge from between the closely-spaced trays of the settler and to remove the finer particles from all of the stages of filtration and treatment. These embodiments further avoid interfering with the settling of settleable-particles (e.g., avoid mixing the previously-settled-particles with the cleaner fluid), and avoid the by-pass and duplication of equipment that characterizes prior filter systems, for example. In summary, these embodiments configure each of the stages of settling, filtration, and treatment so that each such stage is compatible with the common gantry drive that operates to simultaneously remove the sludge from between the closely-spaced trays of the settler, and to remove the finer, non-settleable particles from all stages of filtration and treatment.

One way of increasing efficiency in separating and removing particles from a fluid flow stream involves particles having a plurality of types of characteristics, such as being settleable or non-settleable. Apparatus for separating and removing such particles having the plurality of types of characteristics may include a basin in which the fluid flow stream may flow in a flow direction, where the fluid flow stream includes particles having a plurality of types of characteristics. A settler structure may be provided for configuring the fluid flow stream into a first of a plurality of serial flow paths in the basin. The first flow path may be configured to separate from the flow stream a type of particle that is settleable. The settler structure may be configured with a pocket to retain settled particles spaced in a depth direction from the first flow path so that the fluid flow stream without the separated settled particles and with non-settleable particles flows past the first flow path. A filter structure may be provided for configuring the fluid flow stream into a second of the plurality of serial flow paths downstream of the first flow path in the basin. The filter structure may be configured in the depth direction and in a width direction transverse to the flow and depth directions to separate from the flow stream a type of particle that is not-settleable. A gantry structure may be configured with a pair of gantry arms hanging in the depth direction and straddling the settler structure. The gantry structure may be further configured with a pusher extending through the pocket and between the pair of gantry arms. The gantry structure may be further configured with a third arm hanging in the depth direction parallel to and across the filter structure. The third arm may be configured to apply a cleaning action to the filter structure. A common gantry drive is provided for simultaneously moving all of the arms in the width direction transverse to the flow and depth directions, the moving pair of arms causing the pusher to remove the settled particles from the pocket and the third arm causing the removal of the non-settleable particles from the filter structure.

Another way of increasing efficiency in separating and removing particles from a fluid flow stream involves particles having a plurality of types of characteristics, such as being settleable or non-settleable. Apparatus for separating and removing such particles having the plurality of types of characteristics may include a basin in which the fluid flow stream may flow. A low-angle tray settler is configured to divide the fluid flow stream into an array of vertically-spaced first flow paths, each of the first flow paths being defined by a pair of trays configured to separate the settleable-particles from the respective first flow path. The pair of trays is configured with a pocket below the respective first flow path to receive and retain settled-settleable-particles. The pocket extends in a depth direction from the respective first flow path so that the respective first flow path without the separated-settled-settleable-particles and with non-settleable particles flows past the tray settler. Each pocket is configured with a sludge removal slot through which to remove settled-settleable-particles from the pocket. The slot is located at one side of the pair of trays. A pusher received in each of the pockets extends in the flow direction and presents a thin-profile to the flow in the respective first flow path. Each pusher is movable in the respective pocket toward and away from the respective slot in a width direction perpendicular to both the flow direction and the depth directions. A filter structure configures the fluid flow stream into a second flow path in the basin downstream of the vertically-spaced first flow paths. The filter structure is configured to extend in the depth direction and in the width direction to separate the non-settleable particles from the second flow path. A gantry structure is configured with a pair of arms hanging in the depth direction and spaced in the flow direction to straddle each of the respective pushers received in the respective pocket. The gantry structure is further configured with a third arm hanging in the depth direction parallel to and across the filter structure to apply a cleaning action to the filter structure. A common gantry drive is connected to each of the gantry arms for simultaneously moving all of the arms in the width direction. The moving causes the pair of arms and the respective pushers to move the settled particles simultaneously in each of the respective pockets so that the moved settled-settleable-particles are pushed through the respective sludge removal slots. Also the moving third arm simultaneously applies the cleaning action to the filter structure to remove the non-settleable-particles from the filter structure.

Another way of increasing efficiency in separating and removing particles from a fluid flow stream involves a method operating on particles having a plurality of types of characteristics, such as being settleable or non-settleable. Operations of the method include configuring the fluid flow stream into a plurality of serial flow paths flowing within one basin. Each flow path is configured to separate from the flow stream at least one type of the particles so that the fluid flow stream without the respective separated particles flows in the one basin from a first flow path to a next flow path in the one basin. Another operation simultaneously removes the at least one type of separated particles from each of the serial flow paths in the one basin.

Yet another way of increasing efficiency in separating and removing particles from a fluid flow stream involves a method for particles having a plurality of types of characteristics, such as being settleable or non-settleable. Operations of the method include configuring the fluid flow stream into a plurality of serial flow paths in one basin. A first flow path is configured to separate the settleable-particles from the flow stream so that the separated settleable-particles are retained in a pocket that extends adjacent to the first serial flow path. The fluid flow stream exits the first flow path flowing without the separated settleable-particles and with the non-settleable-particles, the flowing being to a second flow path that is configured in the one basin to separate the non-settleable-particles from the fluid flow stream. The separated non-settleable-particles are removably retained in a filter in the second flow path. Another operation provides a pusher movable in the pocket in a width direction transverse to the flow direction to move the settled-particles away from the flow stream. A further operation provides a filter cleaner to remove the separated non-settleable-particles from the filter. A final operation uses a gantry that is common to both the pusher and to the filter cleaner to simultaneously move the pusher and the filter cleaner in the width direction to remove the settled-particles from the pocket and to remove the non-settleable-particles from the filter.

Still another way of increasing efficiency in separating and removing particles from a fluid flow stream involves a method relating to particles having a plurality of types of characteristics, such as being settleable or non-settleable. Operations of the method include providing in the single basin a first sludge collection pocket configured to extend at a low-angle in the flow direction and in a width direction that is perpendicular to the flow direction. The pocket is configured with a depth in a depth direction that is transverse to both the flow direction and to the transverse direction to receive settleable-particles from the flow stream. Another operation provides a filter configured with a two dimensional filtering face configured to collect non-settleable-particles. Another operation orients the filter with the two-dimensional filtering face downstream of the first sludge collection pocket to collect the non-settleable-particles. Another operation provides a bridge over the first sludge collection pocket and the oriented filter, the bridge being configured with two gantry arms that straddle the sludge pocket and a third gantry arm spaced downstream from the sludge pocket and in the single basin adjacent to the two-dimensional filter face. Another operation positions a sludge pusher in the first sludge collection pocket and extending parallel to the flow direction and connected to the two gantry arms that straddle the sludge collection pocket. Another operation mounts a filter face cleaner on the third gantry arm. Another operation moves the bridge to simultaneously move the sludge pusher in the sludge collection pocket and move the filter face cleaner across the filtering face.

Other aspects and advantages of the present invention will become apparent from the following detailed descriptions, taken in conjunction with the accompanying drawings, illustrating by way of example, the principles of embodiment of the present invention.

BRIEF DESCRIPTION OF THE DRAWINGS

The present invention will be readily understood by the following detailed description in conjunction with the accompanying drawings, wherein like reference numerals designate like structural elements or operations.

FIG. 4 is a plan view of the common gantry drive having a beam extending above the stages and rails on which the beam rides for moving the pusher and cleaners of the filter and UV treatment stages.

FIG. 5A is a cross-sectional view of an embodiment of a filter stage in which a filter cleaner is moved across a face of the filter.

FIG. 5B is a cross-sectional view of another embodiment of the filter stage in which a similar filter cleaner is moved across the face of the filter, and a series of jets assists the cleaner in removing filtered particles from the filter.

DETAILED DESCRIPTION OF THE PREFERRED EMBODIMENTS

Embodiments of the present invention meet the above needs by providing more efficient ways of separating both settleable-particles and finer, non-settleable-particles from particle-laden fluid. This separation allows combination into one basin of many successive stages, e.g., settling, filtration, and ultraviolet treatment stages. A sludge and finer, non-settleable-particle removal system is combined into the one basin that is configured with a common gantry drive. The common gantry drive removes the sludge from between closely-spaced trays of an improved settler, such as the settler of the co-pending application. This removing of the sludge occurs during movement of the common gantry drive, and the common gantry drive simultaneously removes finer, non-settleable-particles from all stages of filtration and treatment. These embodiments configure each of the stages of settling, filtration, and treatment so that each such stage is compatible with the common gantry drive that operates to simultaneously remove the sludge from between the closely-spaced trays of the settler, and to remove the finer, non-settleable particles from all stages of filtration and treatment.

In the following description, numerous specific details are set forth in order to provide a thorough understanding of embodiments of the present invention. It will be understood, however, to one skilled in the art, that the embodiments of the present invention may be practiced without some or all of those details. In other instances, well known operations and structure have not been described in detail in order to not obscure the embodiments of the present invention.

Figure 1:
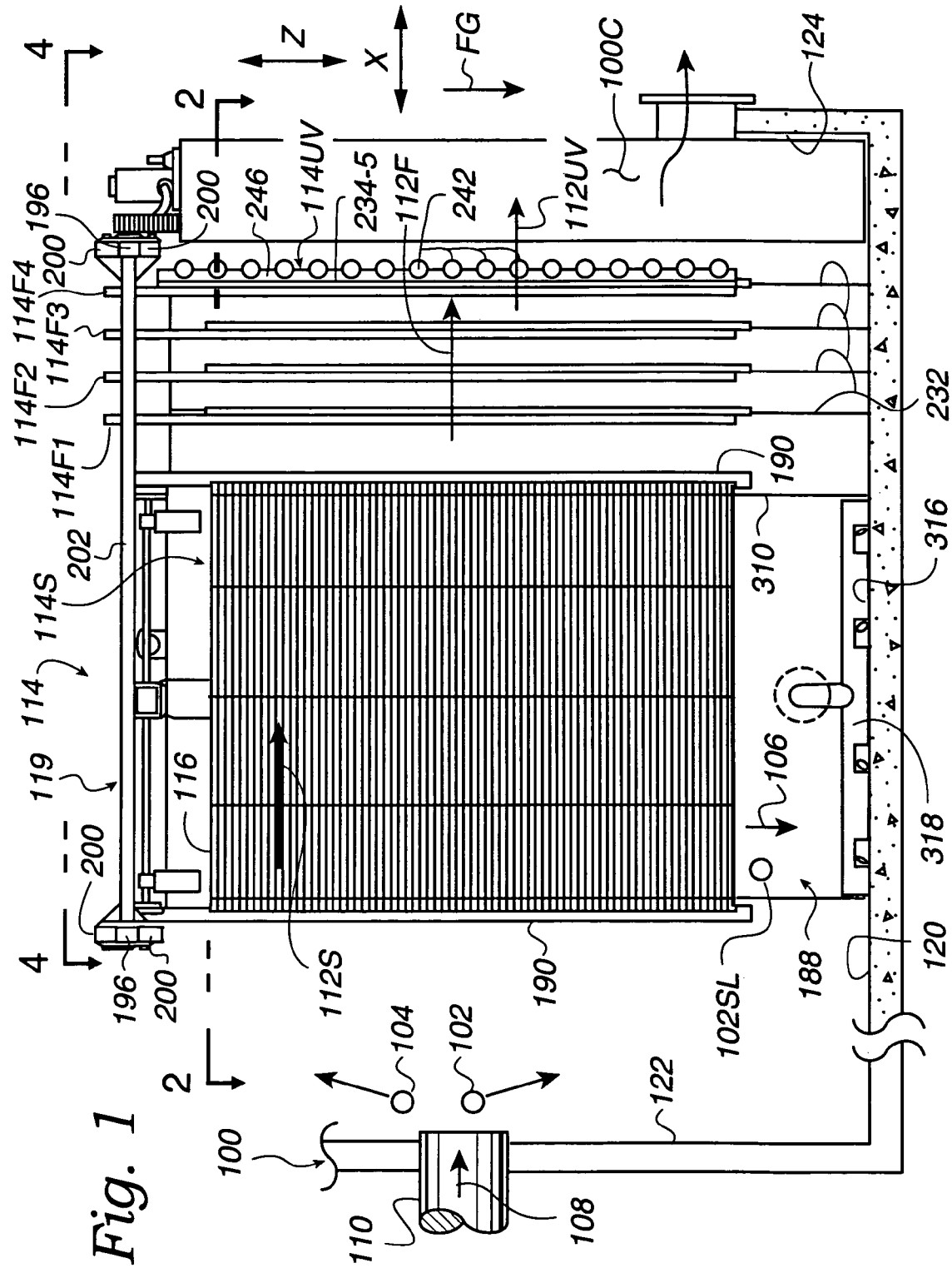
FIG. 1 illustrates a side elevational view of an embodiment of the invention in which apparatus is received in one common basin for separating materials from a fluid flow stream, and removing the materials from the basin.
Figure 2:
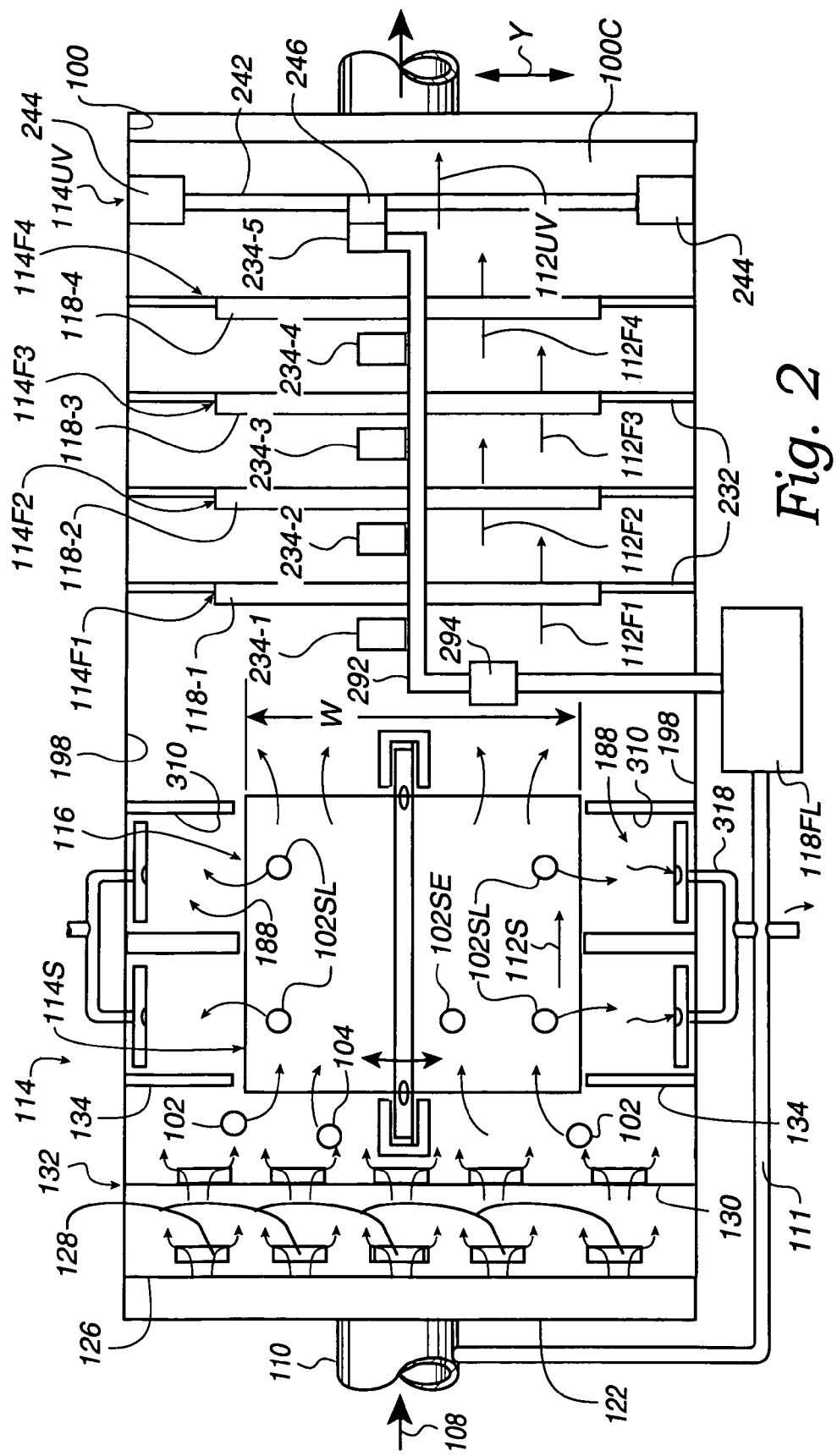
FIG. 2 illustrates a plan view of the embodiment in which the apparatus received in the one common basin has serial stages (e.g., a settler and stages of filters) for separating the materials from the fluid flow stream, and may include a stage for treating the fluid, which may be an ultraviolet (UV) treatment stage, wherein each stage may include facilities for removing the separated materials from the basin.

Referring now to the drawings, FIGS. 1 and 2 illustrate respective elevational and plan views of an embodiment of the invention in which apparatus is received in one common basin 100 for separating materials from a fluid flow stream, and removing the materials from the basin. The materials may be the above-described settleable-particles and non-settleable particles, here respectively referred to as 102 and 104. To identify aspects of separation of the settleable-particles from the fluid, settleable-particles 102 that are settling are referred to as settling-particles 102SE. Also, settleable-particles 102 that have settled are referred to as either sludge, or settled-particles, 102SL. For clarity of illustration and description, with respect to all of the embodiments described below, an orthogonal system is used to indicate axes and directions in which various structures may extend and events may occur. In the orthogonal system, an X axis extends in a longitudinal direction and among other things is a reference for a direction of the flow of the fluids. As described below, the X axis is horizontal. The flow of the fluids may be at a low-angle A, as defined below in respect to FIG. 13, with respect to the X axis. A Y axis extends horizontally in a direction that is transverse to the X axis and among other things is a reference for a direction of a width W through which the fluids flow through a portion of the common basin 100. Among other things the Y axis is a reference for a direction of removal of settled-particles 102SL. The width W may extend at a low-angle, as defined below, with respect to the Y axis. A Z axis (FIG. 1) extends in a direction that is transverse (at a right angle) to both the X axis and the Y axis, and among other things is a reference for a direction (arrow 106, FIG. 3B) of desired rapid movement of the settling-particles 102SE in settling from the fluid (e.g., under the force of gravity FG). The direction 106 is parallel to the Z axis.

Still referring to FIGS. 1 and 2, in general, an incoming dirty fluid flow stream (arrow 108) enters the basin 100 at an inlet 110. The stream 108 may include particles such as the settleable-particles 102 and the non-settleable particles 104. The incoming particles thus have many types of characteristics. In the basin 100, the dirty fluid flow stream 108 is divided into a plurality of serial flow paths. The flow paths are referred to in a general sense by the reference number 112, and a flow path 112 associated with a stage of processing is referred to as 112 plus a designation (e.g., letter/number) identifying a stage 114 of processing, and a particular stage 114 is identified by the same designation. Each flow path 112 is configured to separate from the flow stream 108 at least one type of the particles. For example, in the basin 100 the serial flow paths 112 may include parallel settler flow paths 112S. The flow paths 112S extend through a settler 116 that removes settleable-particles 102 from the fluid flow stream 108 to form the sludge 102SL. The fluid flow stream 108 without the sludge 102SL (i.e., without the respective separated settleable-particles 102) flows in the one basin 100 from the settler 116 to a first of further serial filter flow paths 112F1. The path 112F1 is followed by a serial second filter flow path 112F2, followed by a serial third filter flow path 112F3, followed by a serial fourth filter flow path 112F4, and followed by a serial treatment flow path 112UV. For clarity, FIG. 1 shows these four filter flow paths as 112F, whereas FIG. 2 shows the separate filter flow paths 112F1-F4. In path 112F1 the clean flow stream 108 becomes a cleaner flow stream by successive action of filter stages 114F, e.g., by the action of a first filter 118-1 at stage 114F1, and flows to the next filter flow path 112F2. The fluid flow stream 108 without particles separated by the first filter flows in the one basin 100 from the filter 118-1 to the next flow path 112F2. In path 112F2 the flow stream 108 becomes yet-cleaner by the action of a second filter 118-2 at stage 114F2, and flows to the next filter flow path 112F3. This is repeated in the basin 100 in stage 114F3 by third filter 118-3, and is repeated again in the basin 100 in stage 114F4 by fourth filter 118-4 to output the cleaner fluid. From the fourth filter 118-4 the cleaner fluid flows in the basin 100 to a next treatment flow path 112UV at which it becomes the cleanest fluid and may then be output from the basin 100 via a clearwell 100C (FIG. 1). In each of the flow paths 112 either the settleable particles 102 or the non-settleable particles 104 are retained, e.g., as by the settling, filtering, or treatment process in the respective stage 114, for removal from the basin 100 as described below.

Efficiency is increased by simultaneously removing the separated and retained particles 102 and 104 from each of the flow paths 112 in the one basin 100. One or more types of separated particles so separated and retained may be removed from the flow paths 112 and respective stages 114 for treatment (e.g., by a flocculator 118FL, FIG. 2) and be input to the inlet 110 of the basin 100 via return pipe 111. The flocculator 118FL is shown schematically alongside the basin, it being understood that in practice one or more flocculation stages may also be included in the one basin 100 adjacent to inlet 110. This input to the inlet combines the treated separated particles (most of which have been changed from finer, non-settleable-particles 104 into settleable-particles 102 by the flocculation) with incoming particles 102 and 104 flowing in the flow stream 108. This efficiency increase by simultaneously removing the separated and retained particles 102 and 104 from each of the flow paths 112 in the one basin 100 is by a common gantry drive 119 (FIG. 1), i.e., a drive configured to operate simultaneously with all stages 114 in the basin 100.

Figure 3A:
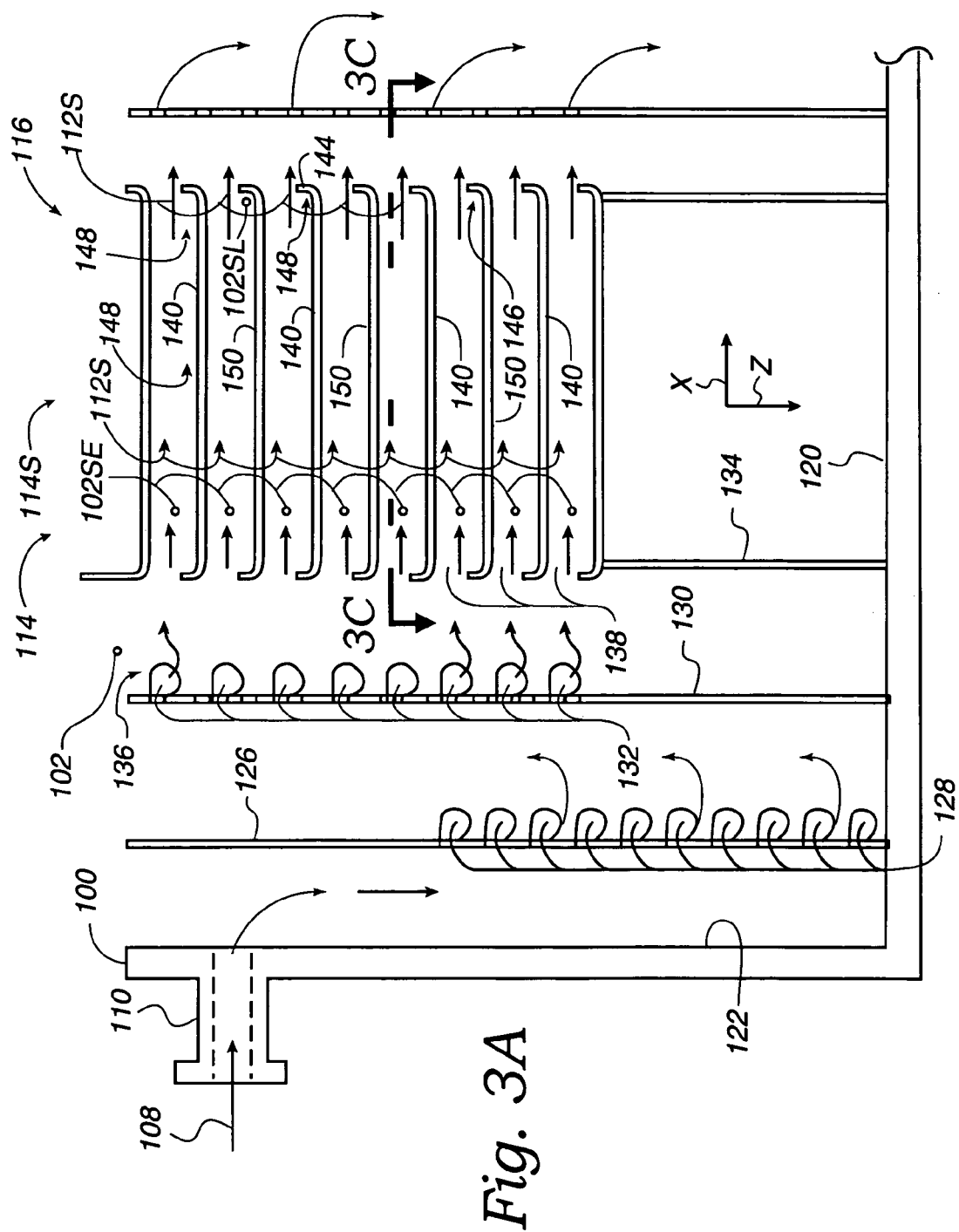
FIG. 3A shows an embodiment of the settler stage in which the fluid flow stream is divided into sludge collection zones from which separated sludge may be removed in a direction transverse to the fluid flow direction.
Figure 3B:
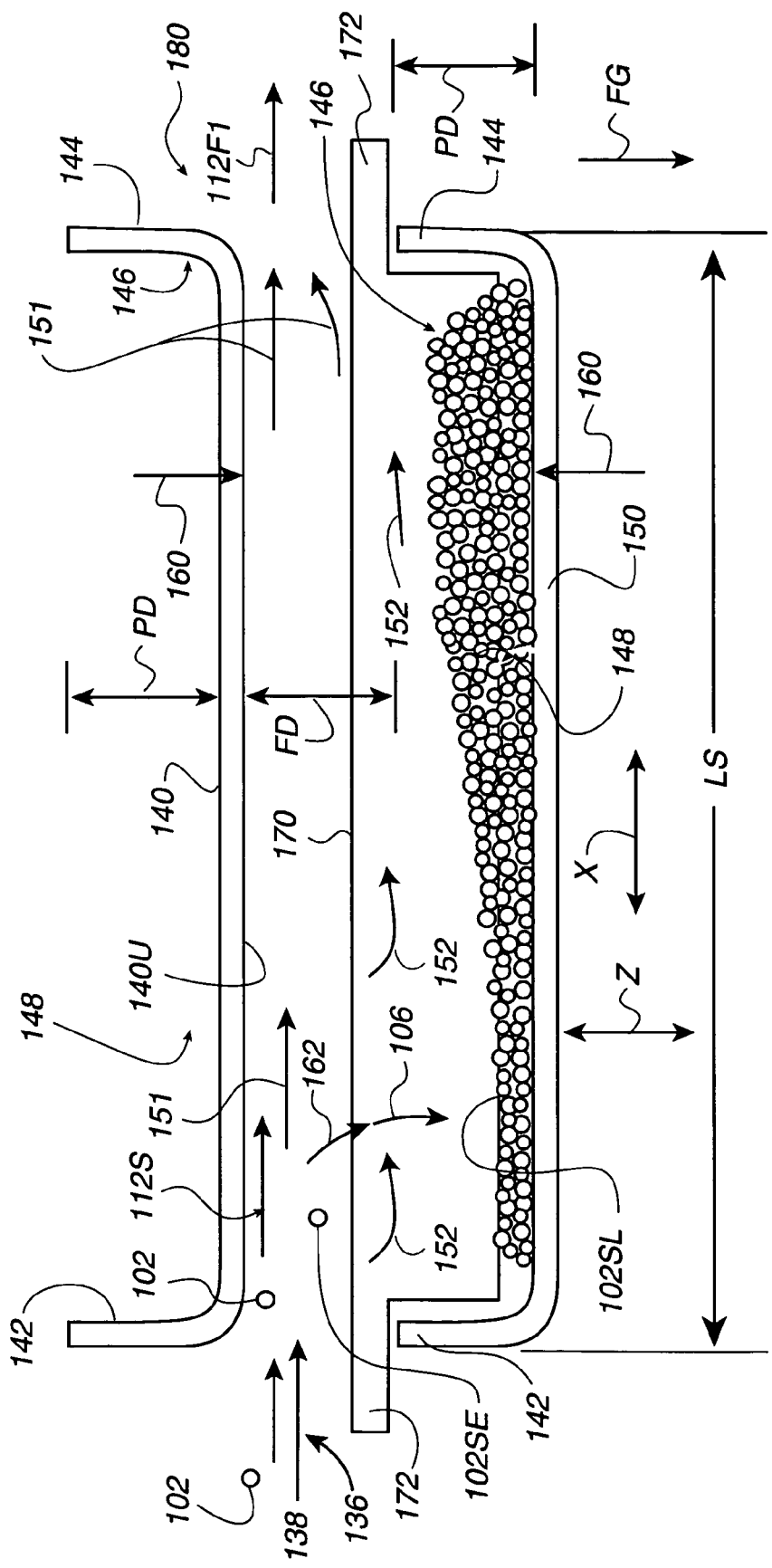
FIG. 3B shows an enlarged portion of the settler, illustrating details of a pair of trays of the settler that promote rapid settling of settled-particles into the sludge collection zone and a pusher removing sludge from the sludge collection zone in a direction transverse to the fluid flow direction.

Considering the first flow paths 112 and stages 114 in more detail, FIGS. 1 and 2, in conjunction with FIGS. 3A and 3B, show an embodiment of the settler 116. Referring primarily to FIG. 3A, the flow stream 108 flows to the settler 116 from the inlet 110 of the basin 100. The basin 100 has a bottom 120, an entrance end wall 122, and an exit end wall 124 (FIG. 1). A first baffle 126 extends fully across the basin 100 and causes the incoming dirty fluid flow stream 108 to flow in the Z axis direction toward the bottom 120. An array of helical flow inlets 128 is spaced across the width of the basin 100 and along the first baffle 126 in the Z axis direction. Each helical flow inlet 128 may be made according to the teachings of U.S. Pat. No. 5,378,378 issued Jan. 3, 1995 for Method Of and Apparatus For Helical Inlet Flow, the disclosure of which is incorporated herein by reference. The helical flow inlets 128 spread the incoming dirty fluid flow stream 108 across the width of the basin 100 and across the height in which the array of inlets 128 is located. A second baffle 130 also extends fully across the width of the basin 100 and turns the spread incoming dirty fluid flow stream 108 upwardly in the Z axis direction. From a mid-point to the top of the second baffle 130, a second array of helical flow inlets 132 is provided. This second array of inlets 132 may be similar to the first inlets 128, and completes the spreading of the incoming dirty fluid flow stream 108 across the width of the basin 100 and across a settler height of the settler 116. The incoming dirty flow stream 108 exits the second array of helical flow inlets 132. A third baffle 134 surrounds a perimeter of the settler 116 and limits the incoming dirty flow stream 108 to flow into an inlet zone 136 of the settler 116. The incoming dirty flow stream 108 in the inlet zone 136 flows through entrance slots 138 that divide the flow stream 108 into many of the serial flow paths 112S within the settler 116.

FIGS. 3A and 3B illustrate structure of the settler 116 that defines the flow paths 112S, the entrance slots 138, and achieving the rapid settling of the settleable-particles 102. FIG. 3A shows a plurality of trays, such as 140 and 150, arranged one above the other in a vertical stack. Although as many as 250 trays may be in the vertical stack, for clarity of description an exemplary fewer pairs of the trays are shown, and in FIG. 3B for clarity of illustration only two such trays are shown to depict tray details applicable to all of the trays. The trays are identified either as 140 or 150 according to whether a upper tray (140) or a lower tray (150) is being described with respect to a pair of the trays. The trays may also be identified as 140/150 when the description applies to both trays. Each tray 140/150 is configured with opposed first lips, one at the left near the zone 136 (referred to as an entrance lip 142) and one at the right (referred to as an exit lip 144). The entrance lips 142 and exit lips 144 cooperate with the next-above tray 140/150 at the opposite ends of the tray. Such cooperation is to define a pocket 146. Each pocket 146 extends at the low-angle A between the respective lips. Each pocket 146 has the width W, a depth PD, and corresponds to a relatively-still sludge collection zone 148, which the pocket 146 defines. FIG. 3B shows the depth PD of the pocket 146 as being defined by the height of the lips 142 and 144. The configuration of the trays 140/150 with the entrance lips 142 divides the incoming dirty flow stream 108 in the settler zone 136. This dividing defines many flow paths 112S. Each flow path 112S is composed of a higher flow rate settling flow 151. The flow path 112S is also composed of a protected lesser flow rate sludge-collection flow 152 that flows in the respective relatively-still sludge collection zone 148 (in the pocket 146). The lesser values of flow rates of the sludge-collection flows 152 in the zones 148 and pockets 146 foster rapid settling of the settling-particles 102SE in the zones 148 and in the pockets 146.

FIG. 3B illustrates details of the rapid settling of the settled-particles 102SE. An exemplary situation may start before any sludge 102SL has settled into the zone 148, and reference is made to an exemplary pair of the trays 140/150, which may be separated by a space 160. This space 160 may be in an exemplary range of from about one inch to about two inches, and there may be about a one-to-one ratio of FD to PD within the space 160. In this manner, between the exemplary pair of trays 140 and 150 there is adequate height for the settling flow 151 and the sludge-collection flow 152, and for reception of the sludge 102SL within the pocket 146 and zone 148. In this exemplary situation that starts before any sludge 102SL has settled into the zone 148, it may be understood that settling of the settled-particles 102 may occur as follows between the exemplary trays 140/150. This settling is represented by the curved arrow 162 (FIG. 3B) extending in the X and Z directions. As the settling-particles 102SE settle, these particles leave the settling flow 151. The curved arrow 162 is shown terminating in the relatively-still sludge-collection zone 148. The extent of the arrow 162, and the termination of the arrow 162 in the zone 148, followed by the arrow 106, indicate that the settling-particles 102SE settle from the flow 151, enter the zone 148, and complete the settling by resting on the bottom of the zone 148, or resting in the zone 148 on previously-settled particles. As noted above, at the completion of the settling, these particles are referred to as the "settled-particles", or the "sludge", 102SL. As the depth of the sludge 102SL increases in the relatively-still sludge collection zone 148 and in the respective pocket 146, there is less of the space 160 between the trays 140 and 150 for the flow 151 and less of the depth PD in the zone 148 and in the respective pocket 146 for the sludge-collection flow 152. Depending on a rate of sludge removal from the pocket 146 (described below), the depth of sludge 102SL in the pocket 146 and zone 148 may gradually increase and become equal to the depth PD. At this time, the incoming flow stream 108 (that forms the settling flow 151 and the sludge-collection flow 152) will tend to be limited to the flow 151 in the depth FD. This limiting of the incoming flow stream 108 to the flow 151 may result from the entrance lip 142 still providing the above-referenced protection. As a result, the entrance lip 142 and the sludge 102SL in the zone 148 and pocket 146 at the depth PD tend to maintain the flow 151 at the depth FD. Also, with the entrance slot 138 configured for admitting the flow stream 108 at a flow rate suitable for the flow in the flow path 112S without any flow 152 in the zone 148 or pocket 146, and with the entrance lip 142 continuing to protect the pocket 146 and the sludge settled in the pocket 146, the continuing flow 151 is less-likely to carry the settled-particles 102SL from the pocket 148 back into the flow 151.

Figure 3C:
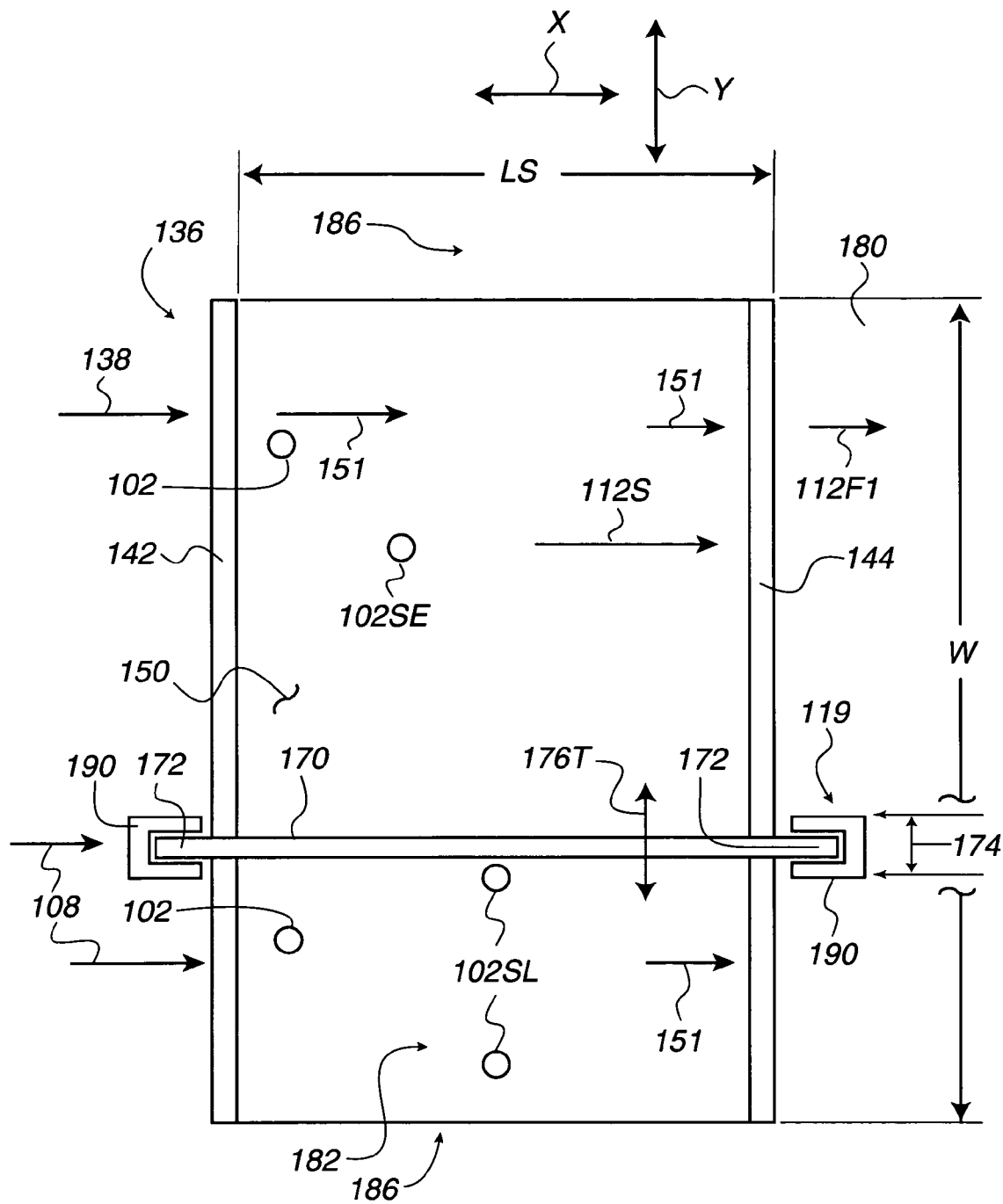
FIGS. 3C and 3D are respective plan and elevational views of FIG. 3B, showing the pusher removing the sludge in response to a common gantry drive.
Figure 3D:
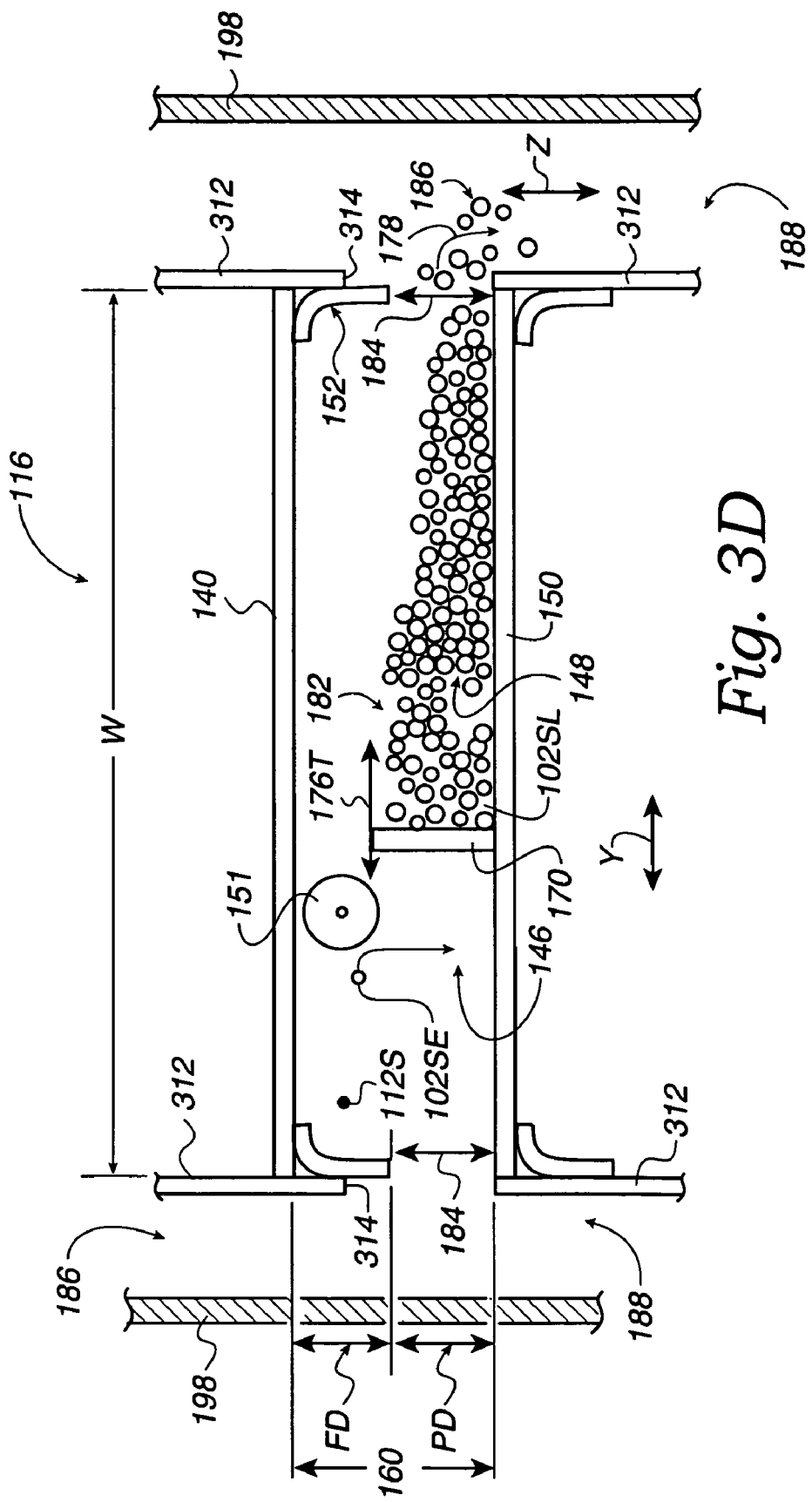

The settler 116 is further configured for removal of the sludge 102SL from each pocket 146 and from each relatively-still sludge collection zone 148. Such configuration is shown in FIGS. 3B, 3C, and 3D, in which FIGS. 3B and 3D depict one pair of trays 140/150, and one tray 150 is shown in FIG. 3C. For such sludge removal, the settler 116 is configured with pushers 170. Each pusher 170 extends (FIG. 3C) in the X axis direction across a length LS of the settler 116. Each pusher 170 is also configured with tabs 172 that extend (FIGS. 3B and 3C) in the X direction beyond the respective lips 142 and 144. The pushers 170 are configured to be transversely-thin (i.e., to have a thin dimension 174 in the direction of the Y axis (FIG. 3C) to present a thin profile to the settling flow 151 and to the sludge-collection flow 152 that are flowing in the X axis direction (FIG. 3B). FIGS. 3C & 3D also show the pusher 170 being transversely-movable, i.e., movable in the Y axis direction (see arrow 176T), which is side-to-side and perpendicular to the X direction of the settling flow 151. In this manner, each pusher 170 is configured for pushing the sludge 102SL out of the respective pocket 146 and out of the respective relatively-still sludge collection zone 148 (FIG. 3D, arrow 178). Also, each pusher 170 is configured with a height just exceeding the depth PD of the pockets 146. Such height enables the tabs 172 of the pushers 170 to extend in the X direction over the tops of the lips 142 and 144 and into the respective zone 136 and into a cleaner flow zone 180 (FIGS. 3B & 3C) for connection with the common gantry drive 119 as described below. In this manner, with each pusher 170 configured so that only the transversely thin profile is presented to the cleaning flow 151 and sludge-collection flow 152 of the fluid flow path 112S, the pusher 170 only minimally interferes with the settling flow 151 and the sludge-collection flow 152. Also in this manner, the pushed sludge 102SL does not enter or cross the settler inlet zone 136 (in which the incoming dirty flow 108 flows), and does not cross the flow 151 entering the cleaner flow zone 180.

With regard to each pusher 170 configured for pushing the sludge 102SL out of the respective pockets 146 and out of the relatively-still sludge collection zone 148, a further aspect of an embodiment shown in FIG. 3D is a transport section 182, which is a part of the relatively-still sludge-collection zone 148. The section 182 is the portion of the pocket 146 and zone 148 that is in "front" of the pusher 170 as the pusher moves in the Y direction while pushing the sludge 102SL out of the pocket 146 and respective zone 148. The pusher is also shown in FIGS. 3B & 3D extending along the full extent of the depth PD of the pocket 146 and respective relatively-still sludge collection zone 148. As viewed in FIG. 3D, with most of the exemplary sludge 102SL shown as being to the right of the pusher 170, it may be understood that the exemplary pushing is rightward, and the transport section 182 is shown to the right of the pusher 170. FIG. 3D shows the pusher 170 moving to the right to make the transport section 182 smaller and smaller as the sludge 102SL is pushed off the exemplary lower tray 150 through a sludge exit slot, or sludge removal slot, 184 and into a combining zone 186 for flow (arrow 178) under the force of gravity FG into a sludge storage zone 188. While this pushing occurs, the adjacent next-above flow path 151 continues to flow in the X direction above the respective pocket 146 and above the respective lower relatively-still sludge collection zone 148 from which the sludge is being removed.

Once the respective pusher 170 has moved to one side of the respective tray, the direction of Y axis movement reverses and the next-settled-sludge 102SL is transported to the other side of the respective tray 140/150. One of the combining zones 186 is shown in FIG. 3C on each side of the trays 140/150. Each zone 186 combines the sludge 102SL received from the vertical stack of relatively-still sludge collection zones 148 and transport sections 182 during the respective one of the side-to-side Y direction traverses of the pushers 170.

In review, the above-described sludge removal operation is characterized by neither the pusher 170 nor the sludge 102SL entering or crossing the settler inlet zone 136 in which dirty incoming fluid flows. Thus, both such zones 186 and 188 that receive the sludge 102SL are separate from all of the settler inlet zone 136, the settling flow 151, and the cleaner flow zone 180. As a result, for example, cleaner fluid of the settling flow 151 flowing out of the settler 116 exits without being combined with particle-laden fluid or with sludge 102SL. Additionally, a sludge removal rate may be selected to further minimize pusher 170 interference, for example, with the settling flow 151 above the pocket 146 and above the relatively-still sludge collection zone 148, and to minimize combination of the settled-sludge 102SL with such settling flow 151 or with the sludge collection flow 152. The sludge removal rate is the rate at which one of the pushers 170 is moved across the respective relatively-still sludge collection zone 148 and respective pocket 146 for sludge removal. In one embodiment, such rate may be in the range of from about one to about twelve inches per minute, for example. In a more preferred embodiment, such rate may be in the range of from about three to about nine inches per minute, for example. In a most preferred embodiment, such rate may be in the range of from about four to about eight inches per minute, for example. In each such embodiment, the sludge removal rate is selected so that the depth of the sludge 102SL in the zone 148 generally does not exceed about 0.5 inches, for example, when the space 160 between the trays 140/150 is a total of about 1.0 inch, for example.

Referring to FIGS. 1, 3C, and 4, each of the pushers 170 is moved by the common gantry drive 119. The common gantry drive 119 is configured with a pair of spaced channels (or arms) 190. The channels 190 extend vertically (in the Z direction, FIG. 1) and are spaced in the X direction (FIGS. 1 and 3C) to straddle all of the trays 140 and 150. Each of the channels 190 is also configured with the narrow dimension 174 (FIG. 3C) that extends in the Y direction. The narrow dimension 174 significantly limits interference of the channels 190 with the incoming dirty flow stream 108 and the flow path 112S. A bridge structure 194 shown in the plan view of FIG. 4 carries and moves both of the channels 190 at the same time and in the same direction, which is the direction of the Y axis. FIGS. 1 & 4 show the bridge structure 194 including rails 196 that are spaced in the X direction and each mounted to extend across side walls 198 of the basin 100. The rails 196 thus span the basin 100 in the Y direction and support rollers 200 secured to a beam 202 of the bridge structure 194. The beam 202 spans the stages 114, extending from the zone 136 to the stage 114UV. The beam 202 suspends and thus carries the spaced channels 190, which extend in a vertical orientation, straddling the respective opposite lips 142 and 144 of the trays 140 and 150. The beam 202 is driven to ride on the rails 196. FIG. 4 shows a platform 206 supported on one wall 198 of the basin 100. The platform 206 mounts a motor 208 that drives a shaft 210. On each end of the shaft 210 a sprocket 212 is connected to a drive chain 214. A corresponding platform 206 is mounted on the opposite wall 198 and supports journals 216 for an idler shaft 218 that carries a pair of idler sprockets 220 to support the other end of each drive chain 214. One length of each of the drive chains 214 is connected to one of the sides of the beam 202. As the motor 208 causes the drive chain 214 to advance, a single pass of the pushers 170 occurs and the beam 202 moves across the rails 196 from near one basin side 198 to an opposite basin side 198. In that movement, the beam 202 moves toward being over one sludge removal slot 184 (FIG. 3D). When the pusher 170 is adjacent to the slot 184, the motor 208 of the common gantry drive 119 reverses and the beam 202 is advanced toward the opposite sludge removal slot 184.

In respect to one pair of trays 140 and 150 shown in FIG. 3B, and in respect to one tray 150 shown in FIG. 3C, the bridge structure 194 and the beam 202 move the spaced channels 190 as follows. Channel movement in FIG. 3C is across the width W of the settler 100, in the Y direction, so that the channels 190 engage each tab 172 at an opposite end of each pusher 170. Such engagement is by one channel 190 in the zone 136 and by the other channel 190 in the clean zone 180. The engaged tabs 172 cause each of the pushers 170 to move simultaneously with the other pushers in the Y direction, and to simultaneously move the sludge 102SL in each of the transport sections in 182 in the Y direction through the respective sludge removal slots 184 and into the combination zone 186 (FIG. 3D). When the direction of beam 202 movement is reversed, the beam 202 may cause opposite channel movement in the Y direction to cause the pushers 170 to move the sludge 102SL in the various transport sections 182, through an opposite sludge removal slot 184 (FIG. 3D) and into the opposite combination zone 186. As the sludge depth varies in the pockets 146, the configurations of the channels 190 and of the tabs 172 (FIG. 3C, with spaces between the slot of the channel 190 & the tab 172) allow the tabs 172 and the pushers 170 to move vertically to avoid binding and to accommodate any non-horizontal low-angles A1 and A2 (e.g., FIG. 13) in the X and Y directions at which the trays 140 and 150 may be oriented. The settler 116, and particle separation and removal, are further described in the co-pending patent application.

The filter stages 114 are shown generally in FIGS. 1, 2, and 4. Details of each filter stage 114 are shown in FIGS. 5A and 5B. Each filter 118 is configured with a filter face 230 extending transverse (i.e., Y and Z directions) to the X flow direction, across the basin 100. A baffle 232 is secured to the perimeter of each filter 118 to limit the respective flow path 112F to flow through the respective filter 118. Each filter 118 is also configured to capture a particular-size non-settleable-particle 104, e.g., respective 50, 25, 10, and 5 micron size particles 104 by the respective filters 118-1, 118-2, 118-3, and 118-4. The filtering capability of the filters 118 may decrease as the filtered particles 104 are captured and retained by the filters 118, such that the fewer of the particular size particles are captured and retained the longer the filter 118 is used without being cleaned.

To continuously or periodically remove the retained finer, non-settleable-particles 104 from the filters 118-1 through 118-4, and maintain high filter efficiency, the common gantry drive 119 is further configured with a series of four hanging arms 234 connected to the beam 202. One arm hangs in each of the next flow paths 112F1 through 112F4 extending parallel to and across the filter face 230 of the exemplary 50 micron filter 118-1 through which the next flow path 112F1 flows. FIGS. 5A and 5B refer generally to one such exemplary arm 234 without a "dash #" reference, whereas in connection with a specific filter, the "dash #" reference may be used. For example, referring to FIG. 2, which includes the "dash #" references, arms 234-1, 234-2, 234-3, and 234-4 are configured adjacent to respective filters 118-1, 118-2, 118-3, and 118-4 in the respective next flow paths 112F1, 112F2, 112F3, and 112F4. The configuration of these arms 234 for cleaning is described below in respect to FIGS. 5A and 5B.

FIGS. 1 and 2 show the next flow path 112UV downstream of the flow path 112-F4. The path 112UV flows through an ultraviolet (UV) treatment facility 240 located in the basin at stage 114UV. In one embodiment, the facility 240 is configured with an array of elongated ultraviolet lamps 242, each lamp extending across the basin in the Y direction, with the lamps 242 of the array extending one after the other in the Z direction to direct UV energy onto the last filter 118-4 (through which the flow path 112F4 flows). A lamp support 244 (FIG. 2) is secured to the opposite walls 198 to provide support and power to the lamps. The supports 244 are also configured to limit the respective flow path 112UV to flow through the array of lamps 242. Each lamp 242 in the flow path 112UV may over time receive a deposit of particles that have not been removed from the upstream flow paths 112 (e.g., paths 112S and 112F). FIGS. 1 & 2 show that to clean the deposit from the lamps 242, an array of lamp wipers 246 may be provided, with each wiper configured with an internal contour corresponding to an exterior contour of the respective lamp 242.

The common gantry drive 119 is further configured with a fifth arm 234-5 located in the last flow path 112UV and extending parallel to and across the array of ultraviolet lamps 242. The fifth arm 234-5 supports the lamp wipers 246 in engagement with each of the lamps 242 and for movement in the Y direction. The lamp wipers 246 are urged by the fifth arm 234-5 against the respective lamp 242. The lamp wiper configuration is described below in respect to FIGS. 6A & 6B.

The common gantry drive 119 is operated to simultaneously move the two channels 190 and all of the arms 234-1 through 234-5 in the Y direction transverse to the X flow direction. As a result, the common gantry drive 119 causes the simultaneous removal of the following: (1) settled-particles (sludge) 102SL from all of the pockets 146 of the many trays 140/150, (2) the finer, non-settleable-particles 104 from the filters 118 in the next flow paths 112F-1 through 112F-4, and (3) the finer, non-settleable-particles 104 from the array of UV lamps 242 in the next flow path 112UV in that one basin 100. The removals referenced in (2) and (3) above are explained in more detail below with respect to FIGS. 5A and 5B (item (2); and FIGS. 6A and 6B (item (3).

FIG. 5A illustrates an exemplary one of the arms 234 configured with an exemplary cleaner section 236 mounted on an exemplary one of the arms 234. An exemplary filter 118 is shown extending in the Y direction and exemplary flow 112F4 is shown moving in the X direction to an exemplary right. The arm is configured with a bore 260 that extends the length of the arm 234, which is upward to the beam 202. At the bottom of the arm 234 the bore is closed. Low pressure is applied to the bore 260 as described below. The cleaner section 236 is connected to the bore 260 by many ports 262 that are spaced along the vertical extent of arm 234. The cleaner section 236 is configured with a material inlet chamber 264 that has an opening 266 facing the face 230 of the filter 118 to allow material (e.g., finer, non-settleable-particles 104) to enter the chamber. At the bottom of the arm 234 the chamber 264 is closed so that the chamber 264 is open to the filter 118 only via the opening 266. This material is urged into the chamber 264 in response to low pressure applied to the chamber 264 from the ports 262. Between each side of the chamber 264 and the perimeter of the arm 234, the arm is configured with a foot (or seal) 268 that slides along (and engages) the face 230 of the filter 118 during the movement of the arm 234 along the filter 118 under the action of the common gantry drive 119. The foot 268 seals the arm and the cleaner section 236 to the face 230 of the filter 118, tending to cause the low pressure in the chamber 264 to draw fluid through an area of the filter 118 in a reverse direction (see arrow 270) opposite to the direction of the exemplary flow stream 112F4 (X, left to right in FIG. 5A). This reverse direction flow 270 carries the particles 104 (that were previously separated from the fluid) into the chamber 264. This area of the filter 118 corresponds to the area of the opening 266 of the chamber 264.

The structure and operation of the cleaner section 236 are suitable to enable the reverse flow 270 to restore filtering efficiency to the area of the filter 118 opposite to the opening 266 of the chamber 264. In more detail, the chamber 264 extends the full length of the arm 234 (equal to the height of the entire filter 118). The exemplary arm 234 is configured with a width WC in the Y direction. This width WC is narrow to avoid interfering with the filtering operations. A traverse rate of the arm 234 equals the sludge removal rate, as determined by the common gantry drive 119 for all stages 114. The width WC and the value of the low pressure in the chamber 264 are related to factors such as the traverse rate and, for example, to the amount and type of particles 104 that are collected by the filter 118. As coordinated with the factors that determine a suitable sludge removal rate, and with such width WC and the pressure in the chamber 264, for example, the amount of fluid in the reverse flow may be enough to remove enough of the filtered particles 104 from the filter 118 to restore filtering efficiency to the area of the filter 118 opposite to the chamber 264 based on a single pass of the cleaner section 236. Thus, as the cleaner section 234 traverses once across the entire face 230 of the filter 118, the filtering efficiency may be restored to the entire area of the filter 118 that is presented to the flow.

FIG. 5B shows another embodiment of the arm 234 that may be used in each of the stages 114 of filtering. This is a dual arm configuration in which two arms straddle the one filter 118. The two arms include a first arm designated 234S, corresponding to the above described arm 234. The configuration of the arm 234S is as described above for the arm 234. A second arm 234J is suspended (or hung) from the beam 202 on the opposite (downstream) side of the filter 118 and opposite to the arm 234S. The arm 234J is shown configured elongated to extend opposite to the entire length of the arm 234S. A pressure bore 260P is provided extending the entire length of the arm 234J. At regular intervals along the arm 234J, a jet or nozzle 272 is formed in the arm 234J aligned with the opening 266 in the chamber 264 of the opposed cleaner section 236. The jet 272 is between the bore 260P and a surface 274 of the arm 234J. The surface 274 is opposite to a rear face 276 of the filter 118. Pressurized clean fluid is supplied to the bore 260P, exits the many jets 272, and at high velocity impacts against the rear face 276 and assists in removing the material from the filter 118 and collection in the opposite chamber 264. Such collection is also assisted by the low pressure applied to the chamber 264 from the ports 262. The combined action of the jets 272 and the low pressure applied to the chamber 264 results in drawing the collected material into the chamber 264, and then the low pressure in the bore 260 removing the material to the top of the arm 234S. The use of the arm 232J in conjunction with the arm 234S provides additional variables that may be controlled to provide more assurance of restoring the filtering efficiency to the entire area of the filter 118 that is presented to the exemplary flow 112F4 at the traverse rate of the arms 234S and 234J. For example, an upstream filter such as 118-1 or 118-2 may be provided with the dual arm cleaner configuration if the respective exemplary 50 and 25 micron size particles 104 require more reverse flow (or backflow) for adequate cleaning, as compared to the exemplary 10 and 5 micron size particles 104 filtered from the flow path 112D-3 and 112F-4 by the filters 118-3 and 118-4.

Figure 6B:
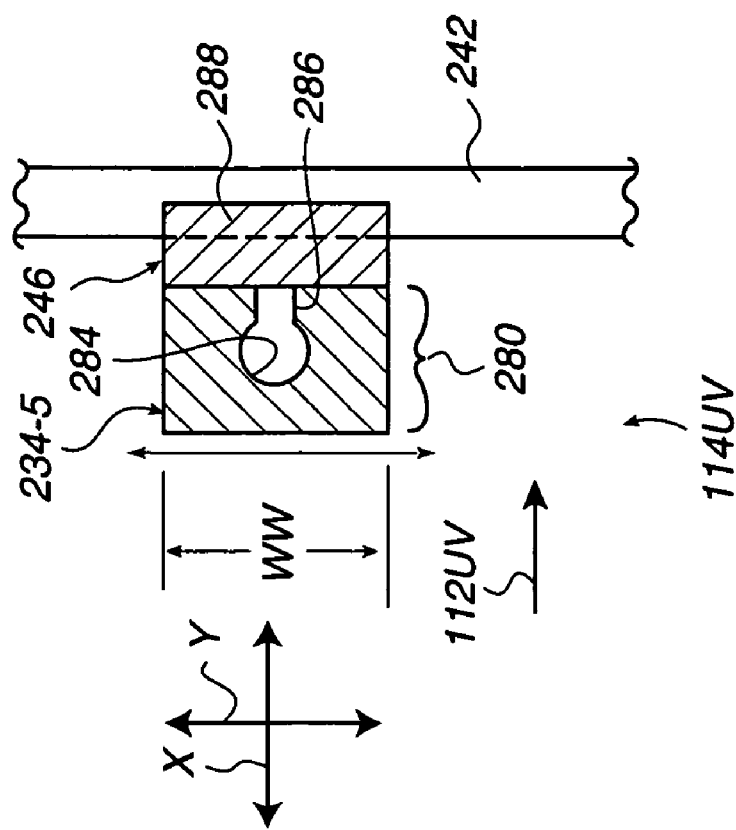
FIGS. 6A and 6B are cross-sectional views of an embodiment of the UV treatment stage in which deposited particles are removed from elongated lamps of the stage by a lamp cleaner moved by the common gantry drive simultaneously with the filter cleaner and the pushers of the settler stage.
Figure 6A:
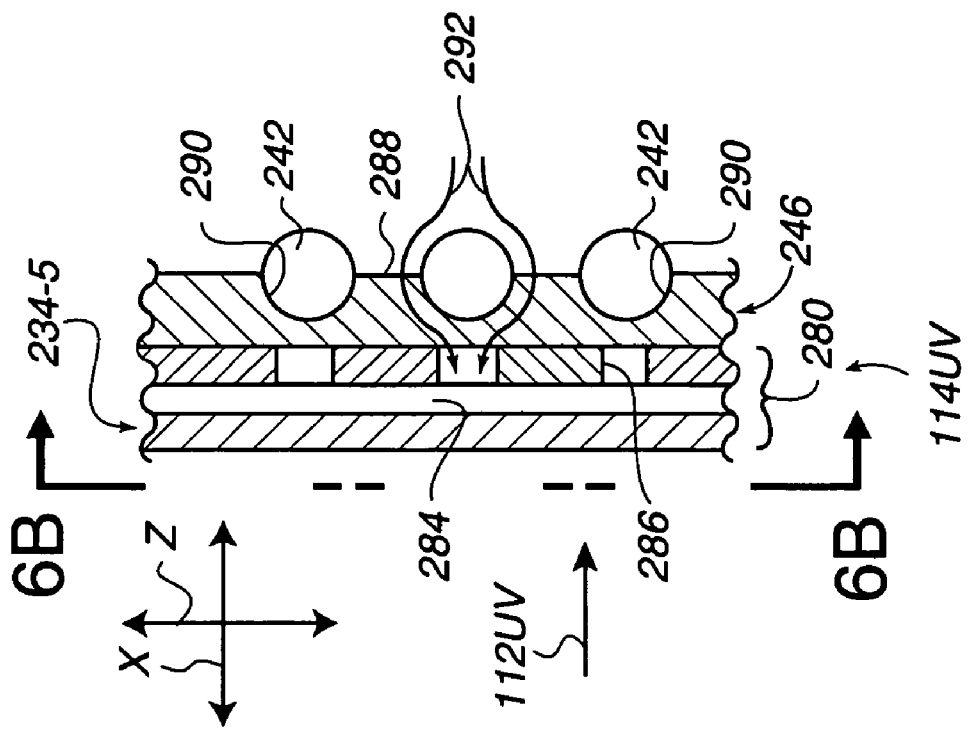

FIGS. 6A and 6B show details of the treatment stage 114UV. An exemplary group of the UV lamps 242 is shown in the array (one above the other in FIG. 6A). The lamps extend in the Y direction (FIG. 6B) from side-to-side across the walls 198 and between the lamp supports 244 (FIG. 2). The arm 234-5 is shown in FIG. 6B having a thin dimension WW in the Y direction, and a support section 280 that extends from the lowest lamp 242 adjacent to the bottom of the basin to the beam 202. The section 280 is provided with an elongated bore 284 that provides low pressure to many ports 286 spaced along the section 280. At the bottom of the arm 234-5 the bore 284 is closed. The ports 286 terminate adjacent to a porous lamp wiper pad 288 of the lamp wiper 246. The pad 288 also has the thin dimension in the Y direction. The pad 288 is elongated in the Z direction, and is configured with a series of lamp-shaped wiper sections 290, each shaped (e.g., in a reverse C-shape) to conform to the shape of the outer surface of the lamps 242. The mounting of the arm 234-5 on the bridge 202 urges the arm toward the lamps 242, so that the arm 234-5 urges the pad 288 against the lamps 242. The lamps 242 are thus nested into the wiper sections 290. The low pressure applied by the ports 286 to the wiper pad 288 causes reverse flows (arrows 292) around the lamps 242 and into the pad 288 to assist in removal of the particles 104 that have deposited on the lamps 242. The nested lamps 242 are also wiped by the wiper sections 290 of the pad 288 as the arm 234-5 is traversed in the Y direction by the common gantry drive 119. The wiping serves to assist in removing from the lamps 242 the particles 104 that have deposited on the lamps 242. The reverse flows 292 into each port 286 serve to collect from the wiper sections 290 the wiped particles 104, which flow up in the bore 284 to the top of the arm 234-5.

The structure and operation of the wiper section 290, ports 286 and bore 284 are suitable to enable the wiping and reverse flows 292 to remove the deposited particles 104 from the lamps with enough efficiency to enable adequate UV energy to be applied to the lamps 242 over long operating times without suspending treatment operations for cleaning of the lamps 242. In more detail, the wiper pad 288 with the wiper sections 290 extend the full length of the arm 234-5 (equal to the height of the entire array of lamps 242). The pads 288 and sections 290 are configured with a width WW in the Y direction. This width WW is narrow to avoid interfering with the UV treatment operations. A traverse rate of the arm 234-5 equals the sludge removal rate, as determined by the common gantry drive 119 for all stages 114. The width WW and the value of the low pressure in the ports 286 are related to factors such as the traverse rate and, for example, to the amount and type of particles 104 that are deposited on the lamps 242. As coordinated with the factors that determine a suitable sludge removal rate, and with the width WW, and the pressure in the chamber 264 and in the bore 284, for example, the amount of fluid in the reverse flow 292 may be enough to remove enough of the deposited particles 104 from the lamps 242 to maintain treatment efficiency of the lamps 242. Thus, as the wiper pad 288 traverses once across the entire Y direction lengths of the lamps 242, the treatment efficiency of the lamps 242 may be maintained along the entire lengths of the lamps 242 that are presented to the flow stream 112UV.

In review, the above-described operations of the stages 114F and 114UV result in filtration and purification of the flow stream 108, and in removal of the separated particles from the filters 118, and removal of deposited particles 104 from the UV treatment stage 114UV. These removal operations in the stages 114F and 114UV, and the sludge removal operation in the stage 114S, occur during each of the single passes of the beam 202 (i.e., from one side 198 to the other side 198 of the basin 100). As a result, the cleaner fluid flowing in the basin 100 to the treatment flow path 112UV has become the cleanest fluid and is output from the basin 100 via the clearwell 100C, which is separate from the combination zone 186 extending in the Z direction to the sludge storage chamber 188 and separate from the sludge storage chamber 188.

To collect the fluid and particles 104 from the filter stages 114F and from the UV stage 114UV, and to perform such collection separately from the cleanest fluid that is to be output from the clearwell 100C of the basin 100, FIG. 2 shows that the bores 260 and 284 of the respective stages 114F and 114UV are connected at an upper end (not shown) to a treatment conduit 292. The conduit 292 is connected to a pump 294 configured to apply a low-pressure to the bores 260 and 284 and cause the above-described removal of materials 104 from the respective filters 118 and lamps 242. The pump 294 forces the fluid and materials to the flocculator 118FL, and then the flocculation-treated materials and suitable amounts of fluid are pumped into the pipe 111 for return to the basin 100.

FIG. 3D shows the combination zone 186 extending in the Z direction to the sludge storage chamber 188. The combination zone 186 and sludge collection zone 188 are configured as a hollow chamber 310 (FIG. 2), which is defined by one side wall 198 and a frame 312 (FIG. 3D) that supports the trays 140/150 and that has openings 314 aligned with the sludge removal slots 184. The chamber 310 extends in the Z axis direction (vertically) to allow the sludge 102SL from the sludge collection zones 148 to fall under the force of gravity FG separate from the incoming dirty flow stream 108, separate from the cleaning flow 151 in the settler 116, and separate from the ongoing cleaning flow 151 (that is in the cleaner flow zone 180 and that flows to the filter stages 114F). FIG. 1 shows that the sludge 102SL falls under the force of gravity FG to a bottom 316 of the chamber 310. Sludge collection pipes 318 are provided at the bottom 316 of the chamber 310 to remove the sludge 102SL from the settler 116 and the basin 100.

Figure 7A:
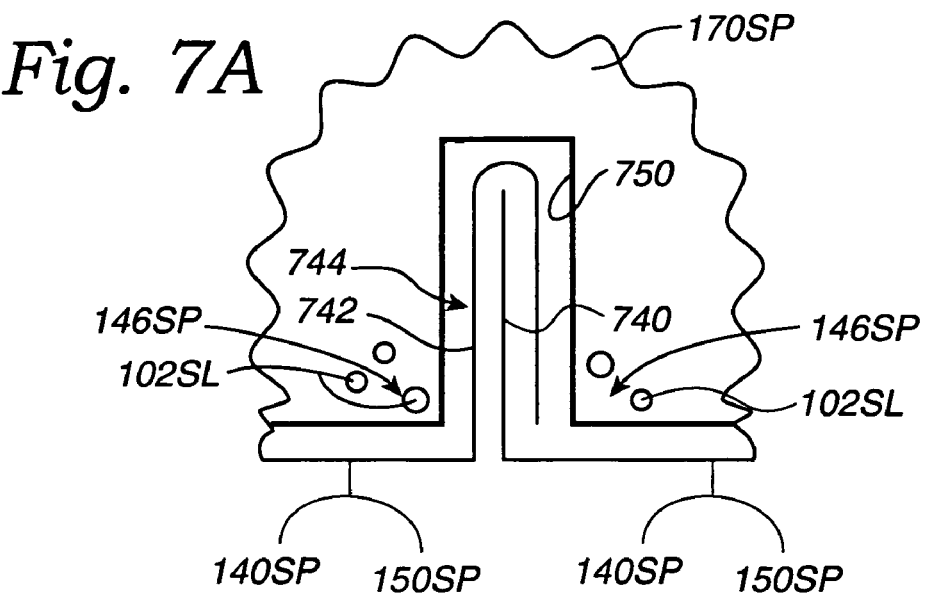
FIGS. 7A and 7B are elevational views of sub-pockets of the sludge collection zone and an embodiment of the pusher for removing sludge from the sub-pockets.
Figure 7B:
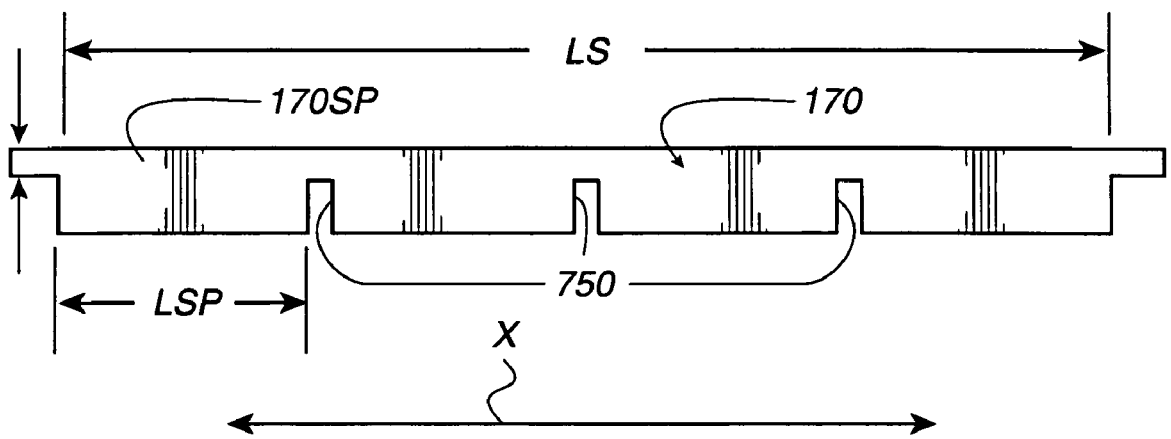

FIGS. 7A and 7B show an embodiment of the settler 116 in which the trays, shown as 140SP and 150SP are configured with sub-pockets 146SP to provide additional capturing of the settled particles 102SL. A pusher 170SP is configured to operate with the sub-pockets, for example. Bottoms of the trays 140SP/150SP are shown, with one tray configured with a first upstanding intermediate lip 740 between the entrance lip 142 and the exit lip 144 (FIG. 3B). The other tray is shown configured with a second upstanding lip 742 that curves over the first lip to form an intermediate divider 744 that divides the pocket 146 into the sub-pockets 146SP. The sub-pockets 146SP are configured with lengths LSP in the X direction (FIG. 7B) that are shorter than the lengths LS of the pockets 146, to form many of the sub-pockets 146SP between the entrance lip 142 and the exit lip 144. In this manner, each sub-pocket 146SP, and each intermediate divider 744, is positioned to capture the sludge 102SL that has settled from the flow 151, which provides more frequent capturing and retaining of the sludge 102SL for removal by the pusher. In this configuration, the pushers 170SP may be modified to have slots 750 shown in FIG. 7B to receive the upwardly extending intermediate dividers 744. The slots are provided at the same spacing LSP as the dividers 744, such that the pushers 170SP are received in the sub-pockets 146SP and operate in the same manner as the pushers 170 to move the sludge 102SL through the sludge exit slots 184.

Figure 8:
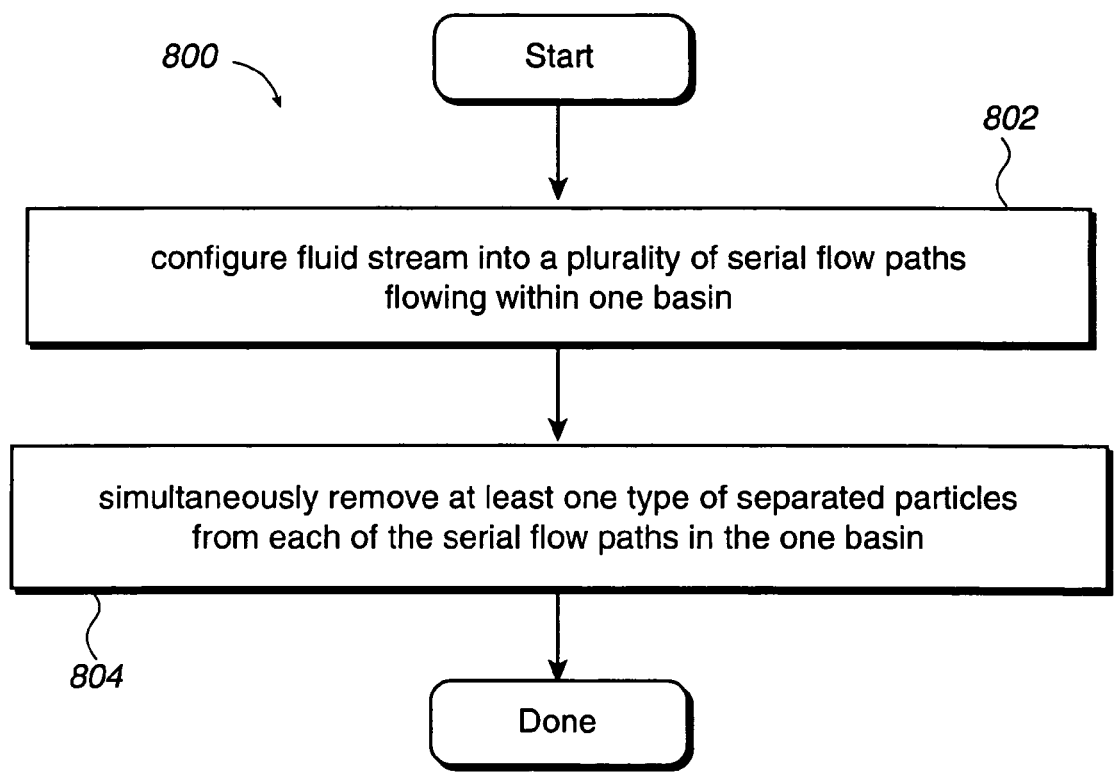
FIGS. 8 through 12 are flow charts illustrating operations of method embodiments of the invention for separating and removing particles from a fluid flow stream.

Referring now to FIG. 8 of the drawings, there is depicted an embodiment of a method performed by the present invention for separating and removing particles from a fluid flow stream. As described above, the particles may have many types of characteristics, illustrated by the respective settling and non-settling characteristics of the particles 102 and 104, for example. The method is shown in a flow chart 800 and starts by moving to an operation 802 of configuring the fluid flow stream into a plurality of serial flow paths flowing within one basin. The basin may be the basin 100 that receives and processes the dirty fluid flow stream 108. Each serial flow path may be a flow path 112 configured to separate from the flow stream at least one type of the particles so that the fluid flow stream 108 without the respective separated particles will flow in the one basin 100. The flow may be from the zone 136 past the settler flow paths 112S to a next filter flow path 112F in the one basin 100, for example. The method moves to an operation 804 in which there is simultaneous removing of the at least one type of separated particles from each of the serial flow paths 112 in the one basin. This simultaneous removing may be performed by the above-described common gantry drive 119 operating to simultaneously move all of the common gantry drive arms 234 in the Y (width) direction transverse to the X flow direction. The common gantry drive 119 thus causes the simultaneous removal of the settled-particles 102 from the pockets 146 in the settler flow paths 112S and the non-settleable-collected-particles 104 from the next serial flow paths 112F and 112UV in that one basin 100. As one example of removal in one serial flow path 112F, as carried and traversed by the common gantry drive 119 across the face 230 of the filter 118F1 (FIG. 2), the arm 234F1 (configured as shown in FIGS. 5A and 5B) cleans the entire face of the filter 118F1 as filtration performed by the filter 118F1 continues. In this manner, this cleaning is done for each of the filters 118 in each of the flow paths 112 simultaneously with the sludge removal from all of the pockets 146 of the settler 116.

Figure 9:
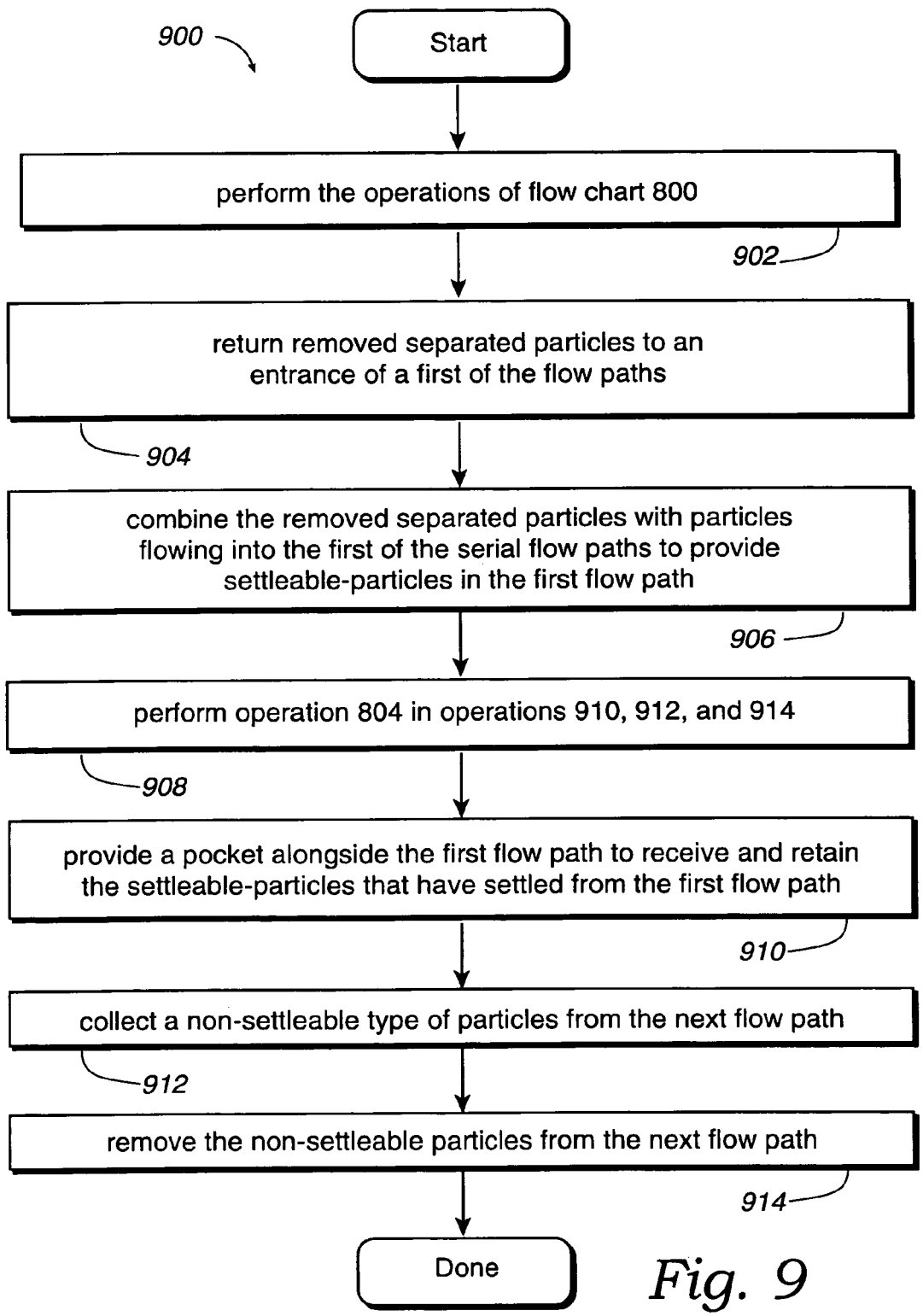

Referring now to FIG. 9 of the drawings, there is depicted another embodiment of the method performed by the present invention for separation and removal of materials. The method is shown in a flow chart 900, and moves to an operation 902, which is performance of the operations of the flow chart 800. For example, the flow chart 800 operations may result in separation and removal from the basin 100 of the sludge 102SL in the flow paths 112S via operation of the settler 116 and the common gantry 119 and the sludge collection pipes 318. As another example, the flow chart 800 operations may result in separation and removal from the basin 100 of the non-settleable particles 104 in the flow paths 112F via operation of the common gantry 119 and the arms 234-1 though 234-4 with the lamp wipers 246, delivering the particles 104 to the treatment pipe 292.

The method moves to an operation 904, in which there is return of at least one type of the removed separated particles to an entrance of a first of the flow paths. The returned particles may be the non-settleable particles 104 removed from the flow path 112F by any one or more of the filters 118, for example, and collected in the treatment conduit 292. Similarly, the returned particles may be the non-settleable particles 104 removed from the flow path 112UV by the lamp wipers 246, for example, and collected in the treatment conduit 292. The return may be via the pump 294 and the flocculator 118FL to the pipe 111. The entrance may correspond to the inlet 110 leading to the zone 136 of the basin 100, and the first flow path may be the settling flow path 112S.

The method may move to an operation 906 in which there is combining of that at least that one type of the removed separated particles with particles flowing into the first of the serial flow paths to provide settleable-particles in the first flow path. The combining may involve the incoming settleable-particles 102 incoming to the inlet 110 from a municipal waste water plant. The combining may be with the non-settleable particles 104 removed from the filters 118 (or from the lamps 242) that have been treated in the flocculator 118FL outside the basin, for example. When the flocculator 118FL is inside the basin 100, the combining may be by having the pipe 111 join the inlet 110 and deliver the removed separated non-settleable particles from the stages 114F and 114UV that were pumped to the pipe 111, for example. The flocculation may be referred to as processing of the at least one type of the removed separated particles (e.g., 104) for separation in a next stage 114S or 114F, for example.

The method may move to operation 908 in which an embodiment of the removing operation 804 is performed. In this embodiment, one aspect of removing per operation 908 is an operation 910 of providing a pocket alongside the first flow path to receive and retain the settleable-particles that have settled from the first flow path. Such pocket may be one of the settler pockets 146 (FIG. 3B) or sub-pockets 246SP (FIG. 7A) that allow a non-settleable type of the particles to flow past the pocket 146 in the one basin 100. Such pocket 146 may define one of the sludge collection zones 148, for example. As described above, the settleable-particles 102 are retained by the exit lips 144 (or by the intermediate divider 744, FIG. 7A) against flow out of the settler pockets 146.

The method moves to an operation 912 of collecting the non-settleable type of particles from the next flow path. The next flow path may be the path 112F, for example, or the downstream flow path 112UV. The collecting operation 912 may be by placing the filter 118 in the next flow path 112F, for example. In another embodiment, the collecting operation 912 may be by placing the lamps 242 in the next flow path 112UV, and collecting non-settleable particles 104 on the lamps. The method moves to an operation 914 of removing the non-settleable particles from the next flow the path. This removing may be to remove such particles that have been collected by the filters 118F or that have been deposited on the lamps 242. The removing operation 914 may be by operating the arms 234-1 through 234-4 with the cleaner sections 236 during the traversing of the common gantry drive 119, for example, to clean the filters 118 in the next flow path 112F, for example. In another embodiment, the removing operation 914 may be by operating the lamp wipers 246 during the same simultaneous traversing of the common gantry drive 119, for example, so that the non-settleable particles 104 are removed from the lamps 242. In each embodiment, the non-settleable separated particles so removed from the flow paths 112F and 112UV may be continuously returned to the basin 100 by the conduit 292 and pipe 111. The returning may be followed by combining the returned separated particles with particles flowing to the first flow path 110 to provide additional settleable-particles in the first flow path. This combining may be by operating the flocculator 118FL.

Figure 10:
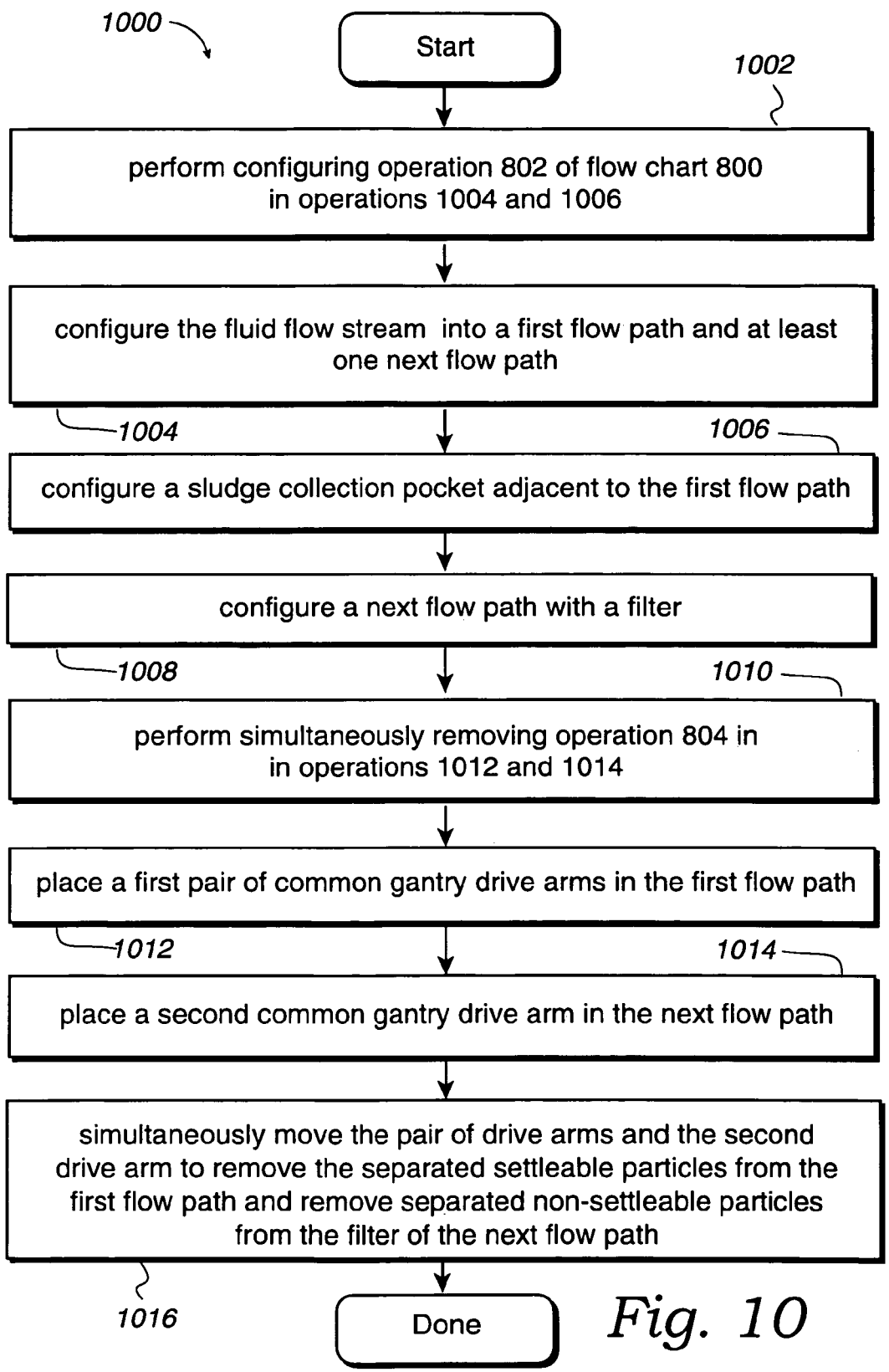

Referring now to FIG. 10, there is depicted another embodiment of a method performed by the present invention for separating and removing particles from a fluid flow stream. The method is shown in a flow chart 1000 and starts by moving to an operation 1002 of performing an embodiment of the configuring operation 802 of flow chart 800. In this embodiment, the method moves to an operation 1004 of configuring the fluid flow stream into a first flow path and into at least one next flow path. The first flow path may be the path 112S, and the at least one next flow path may be the path 112F or 112UV, for example. The method moves to an operation 1006 of configuring a pocket adjacent to the first flow path. The pocket may be one or many of the pockets 146 configured to separate and capture the settleable-particles 102 from the flow stream 108. The method moves to an operation 1008 of configuring the next flow path with a filter. The filter may be a filter 118 having a filter face 230 and configured to capture non-settleable particles (e.g., 50 micron particles). The next flow path may thus be the flow path 112F1, for example, configured with the filter 118-1 having the filter face 230 extending transverse (Y direction) to the X flow direction to capture the non-settleable particles 104.

The method moves to an operation 1010 in which an embodiment of the simultaneously removing operation 804 is performed. In this embodiment, the method moves to operation 1012, which may comprise placing a first pair of common gantry drive arms in the first flow path stream. This may be done by placing the channels 190 of the common gantry drive 119 in the first flow path 136 and in the cleaner flow path 180, each channel 190 extending transverse (Z direction) to the X flow direction. The channels 190 may be spaced in the X flow direction and straddle the thin-profile pushers 170 that extend through each of the pockets 146 in the X flow direction. The method moves to operation 1014 in which there is placing a second gantry drive arm in the next flow path. This may be done, for example, by hanging the arm 234-1 from the beam 202 with the arm 234-1 extending parallel to the respective filter face 230 to support the filter face cleaner section 236. The method moves to operation 1016 in which there is simultaneous movement of the pair of drive arms and the second arm to remove the separated settleable particles 102SL from the serial flow path 112S and remove the separated non-settleable particles 104 from the next flow path 112F or 112UV. This operation 1016 may include, for example, a common gantry drive operation by which the beam 202 causes the pushers 170 to push the settled-particles 102SL along the pockets 146 of the settler 116 for travel out the sludge exit slot 184 to the settled-particle storage chamber 188 which is out of the flow stream 108. The pushing and the travel are transverse (in the Y direction) with respect to the longitudinal direction (X direction) in which the flow stream 108 flows. This simultaneous removing of sludge 102SL may be performed, for example, by removing the sludge 102SL from the serial flow paths 112S at the same time as there is removal of the non-settleable particles 104 from the flow paths 112F1-F4. This latter removal may include the above-described common gantry drive 119 operating (simultaneously with the channel movement) to simultaneously move the gantry drive arms 234-1 through 234-4 in the width (Y direction) transverse to the X fluid flow direction. The common gantry drive 119 thus causes the simultaneous removal of (1) the sludge 102SL from all of the pockets 146 and (2) the non-settleable collected particles 104 from the exemplary next flow paths 112F1 through 112F4. Similarly, such removal may be done simultaneously with respect to the stage 114UV. In this manner, this removal of the particles 104 from the filters 118 in the flow paths 112F is done simultaneously with both the removal of the particles 104 from the lamps 242 in the flow path 112UV and the sludge removal from all of the pockets 146 of the settler 116.

Figure 11:
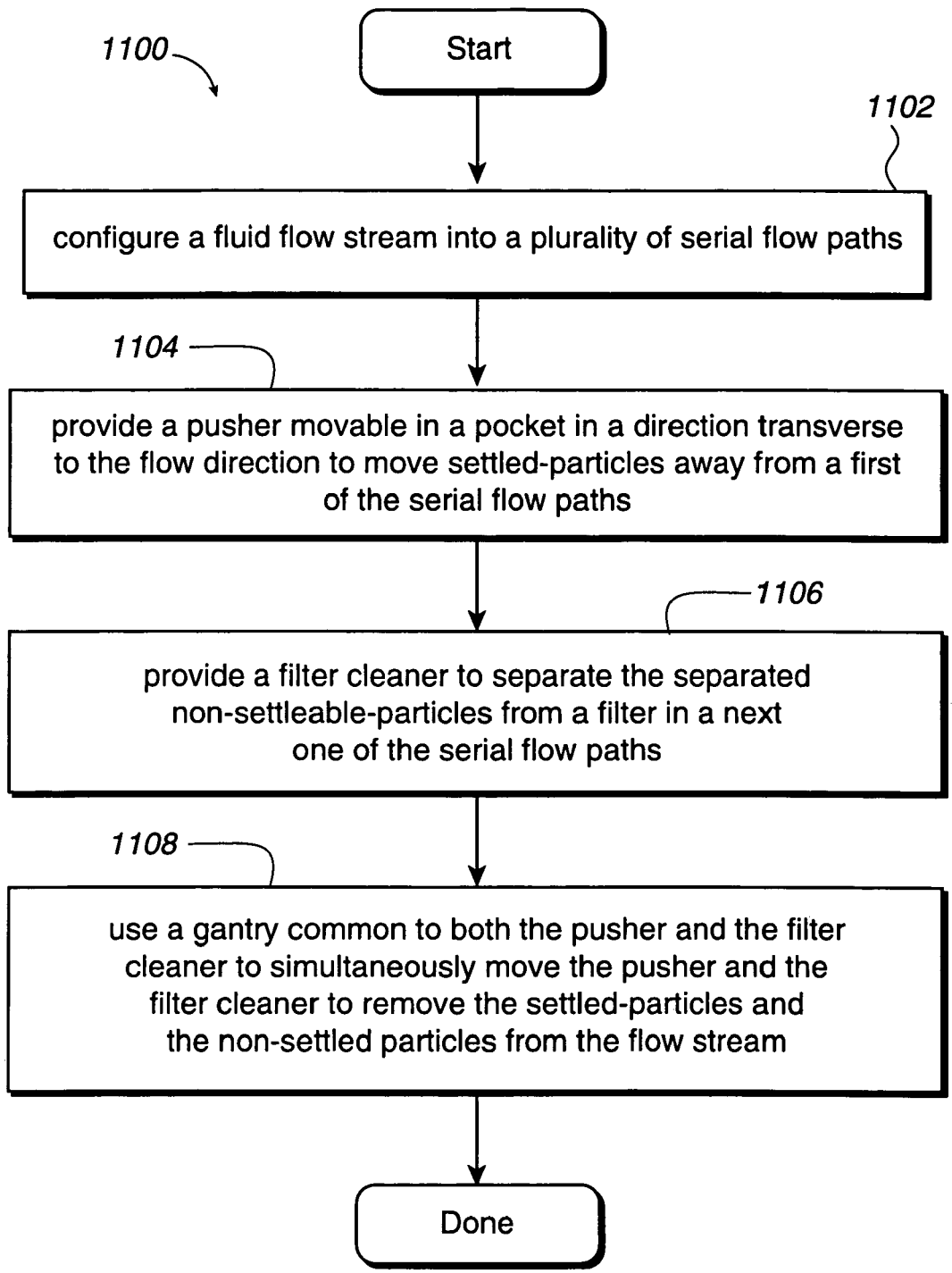

Referring to FIG. 11, there is depicted another embodiment of a method performed by the present invention for separating and removing particles from a fluid flow stream. In this embodiment, the particles may comprise the settleable-particles 102 and the non-settleable-particles 104. The method is shown in a flow chart 1100 and moves to an operation 1102 of configuring the fluid flow stream into a plurality of serial flow paths. In operation 1102 the first flow path may be path 112S configured to separate the settleable-particles 102SL from the flow stream 108 so that the separated settleable-particles 102 are retained in the pocket 146 that extends transverse to the flow direction and adjacent to the first serial flow path. As a result, the fluid flow stream 108 from the first flow path 112S flows without the separated settleable-particles 102SL and may flow with the non-settleable-particles 104. The flowing may be to the second flow path 112F that is configured to separate the non-settleable-particles 104 from the flow stream 108. In an exemplary embodiment of operation 1102, the first flow path may be the flow path 112S configured to separate the settleable-particles 102 from the flow stream 108 so that the separated-settleable-particles 102 (sludge 102SL) are retained in the pockets 146. Exemplary flowing from the paths 112S may be to the next flow paths (e.g., flow paths 112F through the filters 118) that are configured to separate the non-settleable-particles 104 from the flow stream 108.

The method moves to operation 1104 in which there is providing a pusher movable in the pocket in a direction transverse to the flow direction to move the settled-particles away from the flow stream. The pusher may be the pushers 170 in each of the pockets 146, and the pushers 170 are movable in the respective pockets 146 in the Y direction transverse to the X flow direction to move the sludge 102SL away from the flow path 112S.

The method moves to operation 1106 in which there is providing a filter cleaner to remove the separated non-settleable-particles from the filter. An exemplary operation 1106 may provide the filter face cleaner section 236 for removing the non-settleable particles 104 from the entire face 230 of the filter 118 of the flow path 112F as the filtration continues in the flow path 112F.

The method moves to operation 1108 in which there is using a gantry that is common to both the pusher and to the filter cleaner to simultaneously move the pusher and the filter cleaner in the transverse direction to remove the settled-particles from the pocket and to remove the non-settleable-particles from the filter. Operation 1108 may involve the exemplary above-described common gantry drive 119 operating as described to simultaneously move the channels 190 and the various arms 234 in the Y direction transverse to the X flow direction. The common gantry drive 119 thus causes the simultaneous removal of the sludge 102SL from all of the pockets 146 and the removal of the non-settleable collected particles 104 from the exemplary next flow paths 112F and 112UV.

Figure 12:
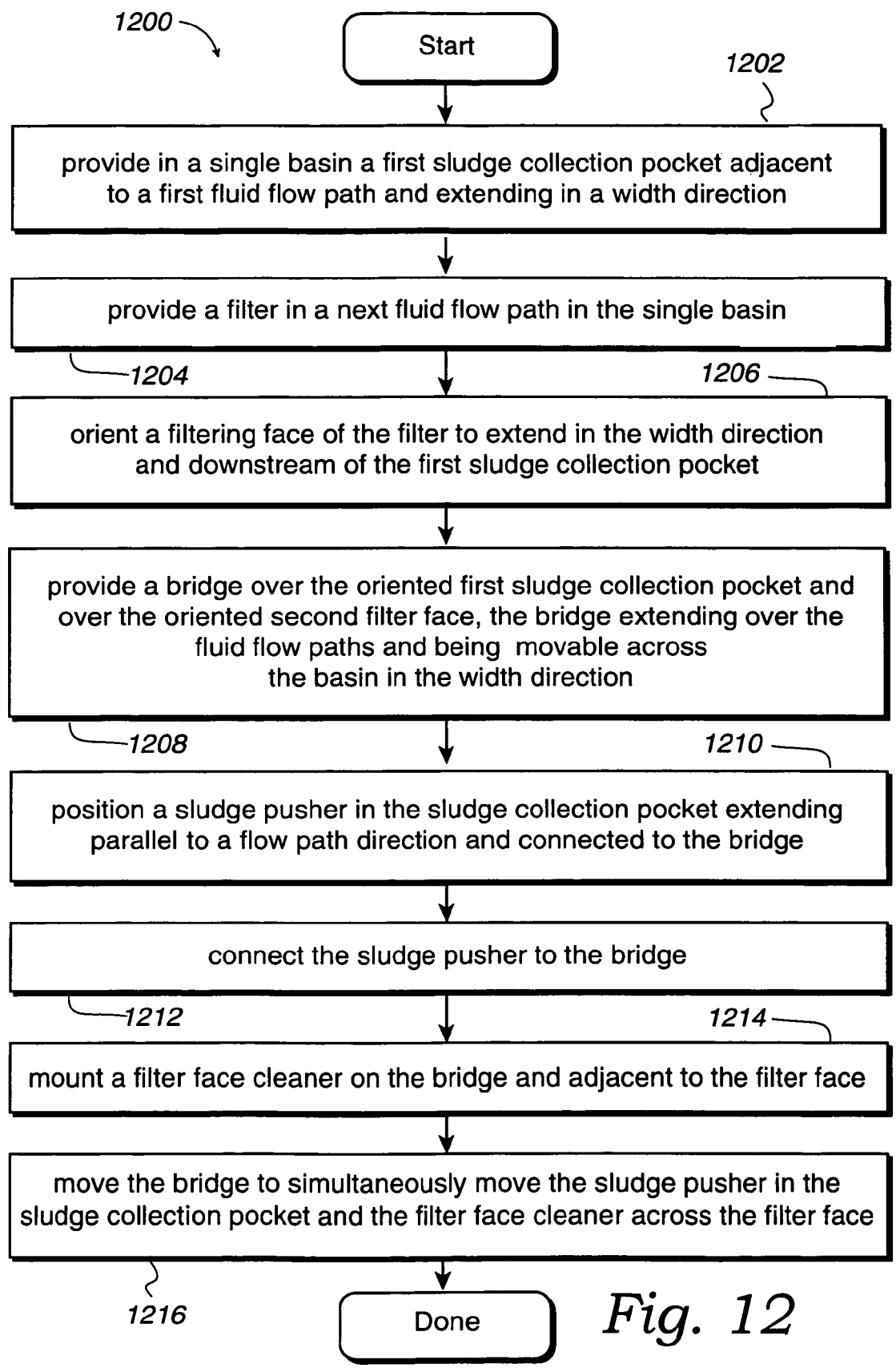

Referring to FIG. 12, there is depicted another embodiment of a method performed by the present invention for separating particles from a fluid flow stream. In this embodiment, the particles may comprise settleable-particles 102 and non-settleable-particles 104 and the flow stream 108 flows in a horizontal flow (X) direction in a single basin, such as the one basin 100. The method is shown in a flow chart 1200 and starts with an operation 1200 of providing in the single basin (e.g., 100) a first sludge collection pocket (e.g., 146) adjacent to a first fluid flow stream (e.g., 108) and extending in a width (Y) direction. The first sludge collection pocket may be the pocket 146 of the many pockets of the settler 116 that defines many flow paths 112S. The pocket 146 is configured to extend between the entrance lip 142 and exit lip 144 (FIG. 3B) and between the side, sludge exit slots 184. The pocket 146 is configured with the depth PD in the Z depth direction that is transverse to the settling flow 151 and the width Y direction to receive the sludge 102SL from the flow 151.

The method moves to an operation 1204 of providing in the single basin 100 and in a next flow path 112F, for example, a filter 118 configured with a two dimensional filtering face 230 extending parallel to the Z depth and Y transverse directions. The method moves to an operation 1206 of orienting the filter 118 in the flow path 112F with the two-dimensional filtering face 230 perpendicular to the two dimensional opening and downstream of the first sludge collection pockets 146.

The method moves to an operation 1208 of providing bridge structure, such as the beam 202, over the oriented first sludge collection pocket 146 and over the oriented second filter face 230 of the single basin 100. The beam 202 is configured with gantry arms (such as the channels 190) hanging parallel to the Z depth direction. The channels 190 straddle the sludge collection pocket 146. The arms 234 may include further arms 234-1 through 234-5 spaced downstream from the sludge pocket 146 and in the single basin 100.

The method moves to an operation 1210 of positioning a sludge pusher, such as the pusher 170, in the sludge collection pocket 146 and extending parallel to the X flow direction. The method moves to an operation 1212 of connecting the sludge pusher 146 to the two channels 190 that straddle the sludge collection pocket 146 (FIG. 3C), such that the channels are connected to the beam 202 of the bridge structure 194.

The method moves to an operation 1214 of mounting a filter face cleaner, such as the cleaner section 236, on the arm, such as on one of the arms 234-1 through 234-4 (FIG. 5A or 5B). The method moves to an operation 1216 of moving the bridge structure, such as the beam 202, to simultaneously move the sludge pusher 170 in the sludge collection pocket 146 and the filter face cleaner 236 across the filtering face 230. The operation may also simultaneously move the lamp wipers 246 when the UV lamps 242 are in the basin 100.

In view of the above descriptions, it is seen that embodiments of the present invention meet all of the above needs by providing more efficient ways of separating both the settleable-particles 102 and the finer, non-settleable-particles 104 from particle-laden fluid in the flow stream 108. The more efficient separation also allows combination into the one basin 100 of the many successive settling stage 114S and filtration stages 114-1 through 114-4 and ultraviolet treatment stage 114UV, for example. The more efficient separation provides a sludge and finer, non-settleable-particle removal system combined into the one basin 100 that is configured with the common gantry drive 119. The common gantry drive 119 provides practical methods for removing the sludge 102SL from between the closely-spaced trays 140/150 of the improved settler 116, such as the settler of the co-pending application. This removing of the sludge 102SL occurs during movement of the common gantry drive 119, and the common gantry drive 119 simultaneously removes the finer, non-settleable-particles 102 from all of the stages 114F of the filtration. These embodiments also allow each stage 114 of settling (114S) and filtration (114F) to continue operating as the common gantry drive 119 operates to remove the sludge 102SL from between the closely-spaced trays 140/150 of the settler 116 and to remove the finer particles 104 from all of the stages 114F of filtration and treatment 114UV. With the thin profiles described above (pusher 170, channel 190, cleaner section 236, and arm 235-5), that avoid interfering with the settling of the settleable-particles 102SE and with the cleaning operations, those operations are substantially full operations, and avoid the by-pass and duplication of equipment that characterizes prior systems. In summary, these embodiments configure each of the stages 114 of settling and filtration so that each such stage 114 is compatible with the common gantry drive 119 that operates to simultaneously remove the sludge 102SL from between the closely-spaced trays 140/150 of the settler 116, and to remove the finer, non-settleable particles from all of the stages of filtration (114F) and treatment (114UV).

Although the foregoing has been described in some detail for purposes of clarity or understanding, it will be appreciated that certain changes and modifications may be practiced within the scope of the appended claims. For example, in the above description it was said that the flow of the fluids may be at a low-angle with respect to the X axis. While the details of the "low-angle" are as described in the co-pending application, reference is made herein to FIG. 13 to illustrate aspects of the "low-angle" that relate to the operation of the common gantry drive 119.

Such low-angle may be defined with respect to either the X axis or the Y axis, or with respect to both the X and Y axes, as appropriate, and each such X and Y axis is horizontal. An horizontal orientation is indicated by a rectangle 636 (dashed lines) extending in both the X and Y axis directions. In a general sense, this low-angle is an angle between the trays 140/150 and the respective axis X or Y, or both such axes. In the embodiment shown in FIGS. 3A and 3B, which is a preferred embodiment, the low-angle is zero degrees, such that the settling flow 151 and the sludge collection zone 148 are also horizontal and are thus parallel to the respective X and Y axis. Thus, as the channels 190 (FIG. 3C) move the pushers 170 in the Y direction (width), the trays 140/150 are horizontal. Any vertical movement of the tabs 172 in the channels 190 may, for example, be in response to the sludge 102SL in the pockets 146.

Figure 13:
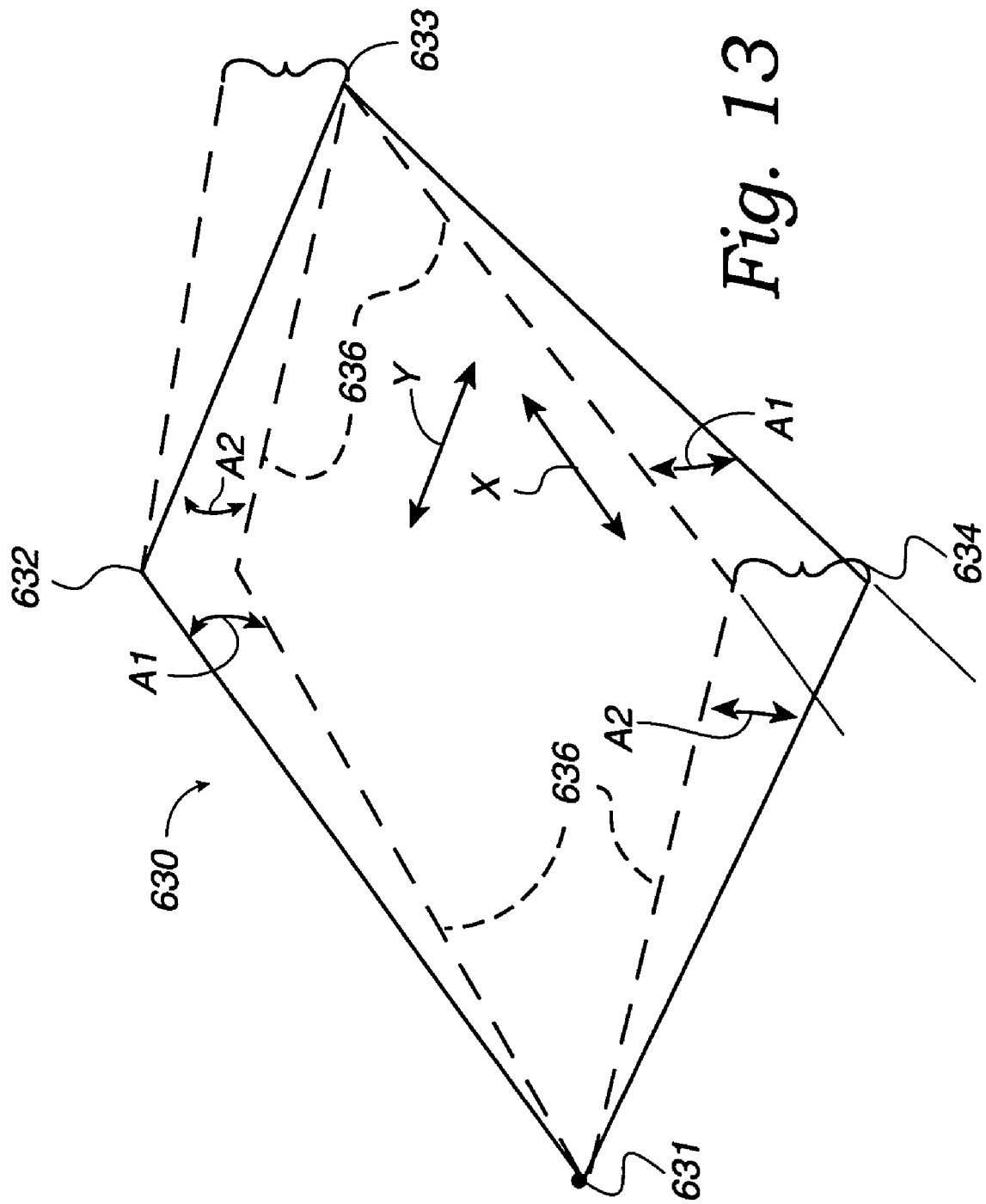
FIG. 13 is a schematic view of embodiments of the invention in which the trays may be at low-angles with respect to horizontal.

In other embodiments shown in FIG. 13, the low-angle may have values other than zero degrees, and the low-angles are indicated by angles A1 and A2, each of which is relative to the rectangle 636 that indicates horizontal. In FIG. 13, for ease of illustration, the values depicted for particular angles A1 and A2 do not correspond to the exemplary values that are specified below for the angles A1 and A2. Also, although the angles A may be with respect to either or both of the X and Y axes, the width W is with respect to the Y axis (angle A2). In more preferred embodiments, the low-angles A1 and A2 may each have a low value other than zero degrees. Considering a more preferred embodiment referred to as a second embodiment, such a low-angle A1 is with respect to the X axis and extends at a positive exemplary value from the corner 631 to corner 632, and at a negative exemplary value from the corner 633 to the corner 634. The value of angle A1 may be in a range of from about just more than zero degrees to a maximum value of about thirty degrees. It may be understood that with the non-zero degree angle A1, as the channels 190 (FIG. 3C) move the pushers 170 in the Y direction (width), the orientation of the trays 140/150 with respect to the X axis is at the low-angle A1 (non-horizontal). The initial vertical orientation of the tabs 172 in the channels 190 will, in this example, be to allow the pusher 170 to assume the same low-angle A1 in the pocket 146. This initial vertical orientation of the pusher 170 would occur before the common gantry drive 119 traverses.

In one of the more preferred embodiments, described as a third embodiment, the low-angle A2 also has a low value other than zero degrees. FIG. 13 also illustrates this third embodiment by showing a negative value of angle A2 extending down from a corner 631 to a corner 634, and from corner 632 to a corner 633. The negative value of angle A2 may be in a range of from about just more than zero degrees to a maximum value of about thirty degrees. The initial vertical orientation of the tabs 172 in the channels 190 will again be according to the value of the angle A1 to allow the pusher 170 to assume the same low-angle A1 in the pocket 146. This initial vertical orientation of the pusher 170 would again occur before the common gantry drive 119 traverses. However, once the drive 119 starts to traverse, the spacing between the channels 190 and the tabs 172 allows the pushers 170 to move up and down in the channels 190 and stay in the pocket 146 by assuming a vertical orientation the same as that of the tray 140/150 at the particular part of the width at which the pusher 170 is located in the pocket 146.

Thus, whether the low-angle A1 is zero degrees or a non-zero low-angle value, and whether the low-angle A2 is zero degrees or a non-zero low-angle value, and whether those non-zero low-angles are positive or negative with respect to horizontal (e.g., the illustrative rectangle 636), the pushers 170 and channels 190 are configured to allow the pushers 170 to follow the angular orientation of the trays 140/150 in each of the X and Y axis directions as the common gantry drive 119 traverses to cause the sludge 102SL to be removed from the sludge collection zone 148 through the sludge removal slots 184.

Accordingly, the present embodiments are to be considered as illustrative and not restrictive, and the embodiments of the present invention are not to be limited to the details given herein, but may be modified within the scope and equivalents of the appended claims.

What is claimed is:

1. Apparatus for separating particles from a fluid flow stream, the particles having a plurality of types of characteristics, the apparatus comprising:
   a basin in which the fluid flow stream may flow in a flow direction;
   a settler structure for configuring the fluid flow stream into a first of a plurality of serial flow paths in the basin, the first flow path being configured to separate from the flow stream a type of particle that is settleable, the settler structure being configured with a pocket to retain settled particles spaced in a depth direction from the first flow path so that the fluid flow stream without the separated settled particles and with a non-settleable type of particles flows past the first flow path;
   a filter structure for configuring the fluid flow stream into a second of the plurality of serial flow paths downstream of the first flow path in the basin, the filter structure being configured in the depth direction and in a width direction transverse to the flow and depth directions to separate from the flow stream a non-settleable type of particle;
   a gantry structure configured with a pair of arms hanging in the depth direction and straddling the settler structure, the gantry structure being further configured with a pusher extending through the pocket and between the pair of gantry arms, the gantry structure being further configured with a third arm hanging in the depth direction parallel to and across the filter structure, the third arm being configured to apply a cleaning action to the filter structure; and
   a gantry drive for simultaneously moving all of the arms in the width direction transverse to the flow and depth directions, the moving pair of arms causing the pusher to remove the settled particles from the pocket and the moving third arm removing the separated non-settleable type of particles from the filter structure.

2. An apparatus as recited in claim 1, the apparatus further comprising:
   a conduit system for transferring the separated non-settleable type of removed particles for processing and input to the settler structure.

3. An apparatus as recited in claim 1, wherein the settler structure is further configured with the pocket extending alongside the first flow path and having a depth in the depth direction to receive and retain the settleable-particles that have settled from the first flow path, the pocket having edges extending in the flow direction to define slots that permit movement of the settled particles out of the pocket separate from the first flow path; and
   wherein the gantry structure is further configured to mount the pusher between the pair of gantry arms and extending in the pocket in the flow direction so that as the gantry drive moves the pair of gantry arms the pusher is moved in the pocket in the width direction to remove the settled particles from the settler structure through one of the slots.

4. An apparatus as recited in claim 1, wherein:
   the gantry structure is configured so that a width of each of the gantry arms of the pair of arms and a width of the pusher between the pair of arms present a thin profile in the width direction to the flow of the fluid in the first flow path.

5. An apparatus as recited in claim 1, wherein the filter structure is further configured to removably retain the non-settleable type of particles separated from the second flow stream; and
   wherein the gantry structure is further configured with the third arm hanging completely across the depth direction of the filter structure so that the third arm moving in the width direction traverses the entire filter structure to remove the non-settleable type of particles from the filter structure.

6. An apparatus as recited in claim 1, wherein the gantry structure is configured so that a width of the third gantry arm presents a thin profile in the width direction to the flow of the fluid in the second flow path.

7. An apparatus as recited in claim 3, the apparatus further comprising:
   a source of ultra violet energy in a third flow path in the basin downstream from the second flow path, the source being configured with a plurality of ultraviolet lamps each extending in the width direction; and
   wherein the gantry structure is further configured with a fourth arm hanging completely across the depth direction of the source, the fourth arm being configured with a lamp cleaner corresponding to each of the lamps so that the fourth arm moved by the gantry drive in the width direction causes the respective lamp cleaners to traverse each of the lamps to remove a non-settleable type of particles from the lamps.

8. An apparatus as recited in claim 1, the apparatus further comprising:
   a sludge storage chamber for receiving the settled-particles removed from the settler structure; and
   a conduit system for removing the settled separated removed particles from the sludge storage chamber.

9. Apparatus for separating particles from a fluid flow stream, the particles comprising settleable-particles and non-settleable-particles, the apparatus comprising:
   a basin in which the fluid flow stream may flow in a generally horizontal flow direction;
   a low-angle tray settler configured to process the fluid flow stream divided into a first array of vertically-spaced first flow paths, each of the first flow paths being defined by a pair of trays configured to separate the settleable-particles from the respective first flow path, the pair of trays being configured with a pocket below the respective first flow path to receive and retain settled-settleable-particles, the pocket extending spaced in a depth direction from the respective first flow path so that the respective first flow path without the separated settled settleable-particles and with non-settleable particles flows past the tray settler, each pocket being configured with a sludge removal slot through which to remove settled-settleable-particles from the pocket, the slot being located at one side of the pair of trays;

a pusher received in each of the pockets, each of the pushers extending in the flow direction and presenting a thin-profile to the flow in the respective first flow path, each pusher being movable in the respective pocket toward and away from the respective slot in a width direction perpendicular to both the flow direction and the depth directions;

a filter structure for configuring the fluid flow stream into a second flow path in the basin downstream of the vertically-spaced first flow paths, the filter structure being configured to extend in the depth direction and the width direction to separate the non-settleable particles from the second flow path;

a gantry structure configured with a pair of arms hanging in the depth direction and spaced in the flow direction to straddle each of the respective pushers received in the respective pocket, the gantry structure being further configured with a third arm hanging in the depth direction parallel to and across the filter structure, the third arm being configured to apply a cleaning action to the filter structure; and a gantry drive connected to each of the gantry arms for simultaneously moving all of the arms in the width direction, the moving causing the pair of arms and the respective pushers to move the settled particles simultaneously in each of the respective pockets so that the moved settled-settleable-particles are pushed through the respective sludge removal slots, the moving third arm simultaneously applying the cleaning action to the filter structure to remove the non-settleable particles from the filter structure.

10. An apparatus as recited in claim 9, the apparatus further comprising:

a source of ultra violet energy located in a third flow path in the basin downstream from the second flow path, the source being configured with a plurality of ultraviolet lamps each extending in the width direction; and wherein the gantry structure is further configured with a fourth arm hanging completely across the depth direction of the source; and the apparatus is further configured with a lamp cleaner mounted on the fourth arm and corresponding to each of the lamps, each lamp cleaner being configured to surround a substantial portion of the respective lamp so that when the fourth arm is moved by the gantry drive in the width direction the respective lamp cleaners traverse each respective lamp to remove non-settleable particles from the respective lamp.

11. A method of separating particles from a fluid flow stream, the particles having a plurality of types of characteristics, the method comprising the operations of:

configuring the fluid flow stream into a plurality of serial flow paths flowing within one basin, each flow path being configured to separate from the flow stream at least one type of the particles so that the fluid flow stream without the respective separated particles flows in the one basin from a first flow path to a next flow path in the one basin; and simultaneously removing the at least one type of separated particles from each of the serial flow paths in the one basin.

12. A method as recited in claim 11, comprising the further operation of:

processing at least one type of the removed separated particles for separation by one of the flow paths; and delivering the processed type of particle to an entrance of the first flow path.

13. A method as recited in claim 12, wherein the simultaneously removing operation comprises the operations of:

providing a pocket alongside the first flow path to receive and retain the settleable-particles that have settled from the first flow path so that a non-settleable type of the particles flows past the pocket in the first flow path in the one basin;

collecting the non-settleable type of particles from the next flow path; and operating a gantry that is common to both the first and next flow paths to simultaneously remove the settled-particles from the pocket and the non-settleable type of collected particles from the next flow path in the one basin.

14. A method as recited in claim 13, wherein:

the collecting operation comprises placing a filter in the next flow path.

15. A method as recited in claim 13, wherein:

the collecting operation comprises placing a source of ultra violet energy in the next flow path; and the gantry operating operation comprises removing from the next flow path non-settleable particles that have deposited on the source.

16. A method as recited in claim 13, wherein:

the gantry operating operation pushes the settled-particles along the pocket for travel to a settled-particle storage facility out of the first flow path, both the pushing and the travel are in a width direction transverse with respect to a longitudinal direction in which the serial flow paths flow.

17. A method as recited in claim 11, wherein the fluid flow stream flows in a flow direction in the flow paths; the method comprising a further operation of:

configuring a pocket adjacent to the first flow path, the pocket being configured to receive from the first flow path and capture a type of particle that is settleable;

wherein the next flow path is configured with a filter face extending in a depth direction transverse to the flow direction to capture a second type of the particles; and wherein the simultaneously removing operation comprises the operations of:

placing first gantry drive arms in the first flow path, each gantry drive arm extending in the depth direction transverse to the flow direction, the first gantry drive arms being spaced in the flow direction and straddling a thin-profile pusher that extends through the pocket in the flow direction;

placing a second gantry drive arm in the next flow path extending parallel to the filter face to support a filter face cleaner; and simultaneously moving all of the gantry drive arms in a width direction transverse to the flow direction and to the depth direction so that the first gantry drive arms move the pusher in the pocket in the width direction and the second gantry drive arm moves the filter face cleaner across the filter face in the width direction.

18. A method of separating particles from a fluid flow stream having a flow direction, the particles comprising settleable-particles and non-settleable-particles, the method comprising the operations of:

configuring the fluid flow stream into a plurality of serial flow paths in one basin, a first flow path being configured to separate the settleable-particles from the flow stream so that the separated settleable-particles are retained in a pocket that extends adjacent to the first serial flow path, the fluid flow stream exiting the first flow path flowing without the separated settleable-particles and with the non-settleable-particles, the flowing being to a second flow path that is configured in the one basin to separate the non-settleable-particles from the fluid flow stream, the separated non-settleable-particles being removably retained in a filter in the second flow path;

providing a pusher movable in the pocket in a width direction transverse to the flow direction to move the settled-particles away from the flow stream;

providing a filter cleaner to remove the separated non-settleable-particles from the filter; and using a gantry that is common to both the pusher and to the filter cleaner to simultaneously move the pusher and the filter cleaner in the width direction to remove the settled-particles from the pocket and to remove the non-settleable-particles from the filter.

19. A method as recited in claim 18, wherein the pusher is configured with opposite ends that are spaced in the flow direction and the filter is configured to extend in the width direction across the fluid flow stream, the method further comprising the operations of:

configuring the common gantry to straddle the pusher and connect to each of the opposite ends; and configuring the common gantry with a profile in the fluid flow stream that is thin in the width direction.

20. A method as recited in claim 18, the method comprising the further operations of:

supplying ultra violet energy to a third flow path in the basin downstream of the second flow path, the supplying being from a plurality of lamps in an array that extends in the depth and width directions; and configuring the common gantry to apply a lamp cleaner to each of the lamps so that as the common gantry simultaneously moves the pusher and the filter cleaner in the width direction the lamp cleaners contact and traverse each of the lamps in the width direction to remove particles from each of the lamps.

21. A method as recited in claim 18, wherein the configuring operation comprises configuring the pocket to extend in a depth direction transverse to the flow direction to receive and retain the separated settleable-particles from the first flow path, wherein the configuring operation further comprises configuring the filter with a two dimensional filtering face extending in the depth direction transverse to the second flow path; and wherein the common gantry is configured with arms moved parallel to the filtering face.

22. A method of separating particles from a fluid flow stream flowing in a flow direction in a single basin, the method comprising the operations of:

providing in the single basin a first sludge collection pocket configured to extend at a low-angle in the flow direction and in a width direction that is perpendicular to the flow direction, the pocket having a depth in a depth direction that is transverse to both the flow direction and to the transverse direction to receive settleable-particles from the flow stream;

providing a filter configured with a two dimensional filtering face configured to collect non-settleable-particles;

orienting the filter with the two-dimensional filtering face downstream of the first sludge collection pocket to collect the non-settleable-particles;

providing a bridge over the first sludge collection pocket and the oriented filter, the bridge being configured with gantry arms that straddle the sludge pocket and with a third arm spaced downstream from the sludge pocket and in the single basin adjacent to the two-dimensional filter face;

positioning a sludge pusher in the first sludge collection pocket and extending parallel to the flow direction and connected to the two gantry arms that straddle the sludge collection pocket;

mounting a filter face cleaner on the third gantry arm; and moving the bridge to simultaneously move the sludge pusher in the sludge collection pocket and move the filter face cleaner across the filtering face.

23. A method as recited in claim 22, the method comprising the further operations of:

supplying ultra violet energy from a plurality of lamps configured in an array that defines an area across the single basin downstream of and generally parallel to the oriented filter; and further configuring the bridge with a fourth gantry arm, the fourth gantry arm being connected to a lamp cleaner engaged with each of the lamps so that as the bridge simultaneously moves the sludge pusher and the filter face cleaner the lamp cleaners contact and traverse each of the lamps to remove particles from each of the lamps.

* * * * *